US012085258B2

(12) United States Patent
Yaphe et al.

(10) Patent No.: US 12,085,258 B2
(45) **Date of Patent: *Sep. 10, 2024**

(54) COUPLERS FOR LIGHT FIXTURES

(71) Applicant: AXIS LIGHTING INC., Lasalle (CA)

(72) Inventors: Howard Yaphe, Lasalle (CA); Andrew Miles, Lasalle (CA); Stephane Beland, Lasalle (CA); Jean Gagne, Lasalle (CA)

(73) Assignee: Axis Lighting Inc., Lasalle (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,315

(22) Filed: Feb. 21, 2023

(65) Prior Publication Data

US 2023/0194059 A1 Jun. 22, 2023

Related U.S. Application Data

(63) Continuation-in-part of application No. 17/369,613, filed on Jul. 7, 2021, now Pat. No. 11,815,245, and a (Continued)

(51) Int. Cl.

*F21S 2/00* (2016.01)
*F21S 8/04* (2006.01)

(Continued)

(52) U.S. Cl.

CPC ............... *F21S 8/043* (2013.01); *F21S 2/005* (2013.01); *F21V 17/12* (2013.01); *F21V 17/18* (2013.01);

(Continued)

(58) Field of Classification Search

CPC .. F21S 8/043; F21S 2/005; F21S 8/036; F21S 8/061; F21S 2/00; F21V 17/12;

(Continued)

(56) References Cited

U.S. PATENT DOCUMENTS

| | | | |
|---|---|---|---|
| D97,213 | S | 10/1935 | Stone |
| D168,812 | S | 2/1953 | Ulrick |

(Continued)

FOREIGN PATENT DOCUMENTS

| | | |
|---|---|---|
| CA | 176779 | 9/2022 |
| CN | 301035080 | 12/2009 |
| WO | WO 2017/119858 | 7/2017 |

OTHER PUBLICATIONS

Amazon, "Barrina LED Linear Light Connector", first available Jun. 28, 2021. (https://www.amazon.com/dp/80983GRWB1/ref=emc_b_5_t} (Year: 2021).

(Continued)

*Primary Examiner* — Donald L Raleigh

(74) *Attorney, Agent, or Firm* — Barnes & Thornburg LLP

(57) ABSTRACT

Disclosed is a junction device for joining adjacent housing sections of a light fixture housing assembly, having a junction body structure formed from at least one junction body segment. A plurality of coupling units, each with at least one first boundary including at least one male portion or at least one female portion. The male and/or female portions are configured to enable each corresponding portion a first of the coupling units to receive the male portion of a second of the coupling units. Each of at least two of the coupling units including a first segment formed with the at least one junction body segment at respective first boundaries with the corresponding male or female portions extending therefrom. Each of the male and female portions is configured to be associated with a first locking structure to lock the female and male portions together to form the assembled light fixture housing.

7 Claims, 37 Drawing Sheets

Related U.S. Application Data continuation of application No. 17/221,511, filed on Apr. 2, 2021, now Pat. No. 11,585,501, which is a continuation-in-part of application No. 16/795,153, filed on Feb. 19, 2020, now Pat. No. 11,079,082, which is a continuation of application No. 16/256,356, filed on Jan. 24, 2019, now Pat. No. 10,584,857, which is a continuation of application No. 15/299,168, filed on Oct. 20, 2016, now Pat. No. 10,215,380.

(51) Int. Cl.

| | |
|---|---|
| ***F21V 17/12*** | (2006.01) |
| ***F21V 17/18*** | (2006.01) |
| ***F21V 21/005*** | (2006.01) |
| *F21S 8/00* | (2006.01) |
| *F21S 8/06* | (2006.01) |
| *F21V 21/14* | (2006.01) |

(52) U.S. Cl.
CPC ............ *F21V 21/005* (2013.01); *F21S 8/036* (2013.01); *F21S 8/061* (2013.01); *F21V 21/14* (2013.01)

(58) Field of Classification Search
CPC ........ F21V 17/18; F21V 21/005; F21V 21/14; F21V 15/015
See application file for complete search history.

(56) References Cited

U.S. PATENT DOCUMENTS

| | | | |
|---|---|---|---|
| 5,452,187 | A | 9/1995 | Belfer |
| D427,336 | S | 6/2000 | Orlandi |
| 6,454,431 | B1 | 9/2002 | Grossman |
| 6,464,179 | B1 | 10/2002 | Bulvan |
| D472,666 | S | 4/2003 | Herst |
| 6,702,453 | B2 | 3/2004 | Weedon |
| D496,748 | S | 9/2004 | Herst |
| 7,293,895 | B2 | 11/2007 | Grossman et al. |
| 7,331,687 | B1 | 2/2008 | Noh |
| D565,786 | S | 4/2008 | Willmorth |
| D591,444 | S | 4/2009 | Beno |
| 7,735,794 | B1 | 6/2010 | Gretz |
| D640,806 | S | 6/2011 | Zheng |
| D641,911 | S | 7/2011 | Gutting |
| 8,128,252 | B2 | 3/2012 | Yasuda |
| D662,646 | S | 6/2012 | Wauters |
| D695,444 | S | 12/2013 | Yang |
| D735,928 | S | 8/2015 | Hawkins |
| 9,395,052 | B1 | 7/2016 | Shew |
| D764,095 | S | 8/2016 | Clark |
| D765,301 | S | 8/2016 | Orellana |
| D797,988 | S | 9/2017 | Sonneman |
| D802,827 | S | 11/2017 | Smith |
| D826,450 | S | 8/2018 | Clark |
| D827,184 | S | 8/2018 | Brennenstuhl |
| D846,179 | S | 4/2019 | Garrett |
| D847,398 | S | 4/2019 | Chen |
| 10,309,634 | B2 | 6/2019 | Webb |
| D865,263 | S | 10/2019 | Amato |
| 10,443,823 | B2 | 10/2019 | Beland |
| D870,363 | S | 12/2019 | Sonneman |
| D882,844 | S | 4/2020 | Mathews |
| D895,194 | S | 9/2020 | Bou |
| D895,887 | S | 9/2020 | Bou |
| D895,889 | S | 9/2020 | Yaphe |
| D905,893 | S | 12/2020 | Walsh |
| D911,592 | S | 2/2021 | Yaphe |
| 11,092,319 | B2 | 8/2021 | Beland |
| D931,519 | S | 9/2021 | Mier-Langner |
| 11,131,446 | B2 | 9/2021 | Beland |
| 11,300,276 | B1 | 4/2022 | Mihalcea |
| 11,585,501 | B2 * | 2/2023 | Yaphe ..................... F21S 8/043 |
| 2009/0296381 | A1 | 12/2009 | Dubord |
| 2010/0321929 | A1 | 12/2010 | Ramirez et al. |
| 2012/0182755 | A1 | 7/2012 | Wildner |
| 2013/0050997 | A1 * | 2/2013 | Bretschneider ........... F21K 9/27 362/382 |
| 2013/0308303 | A1 | 11/2013 | Greenholt |
| 2014/0226316 | A1 | 8/2014 | Medendorp, Jr |
| 2014/0362574 | A1 | 12/2014 | Barrett |
| 2015/0009664 | A1 | 1/2015 | Liang |
| 2015/0070882 | A1 | 3/2015 | Ohno |
| 2015/0300605 | A1 | 10/2015 | Clark |
| 2015/0338068 | A1 | 11/2015 | Bolscher |
| 2015/0364853 | A1 | 12/2015 | Thijssen |
| 2016/0245488 | A1 | 8/2016 | Clark |
| 2017/0082253 | A1 | 3/2017 | Sorensen |
| 2018/0249560 | A1 | 8/2018 | Ando et al. |
| 2018/0313503 | A1 | 11/2018 | Sonneman |
| 2020/0081173 | A1 | 3/2020 | Tak |
| 2020/0217488 | A1 | 7/2020 | Beland |
| 2020/0393099 | A1 | 12/2020 | Yaphe et al. |

OTHER PUBLICATIONS

Amazon, "Direct-Lighting H System Single Circuit Pendant Track Adapter", first available Aug. 30, 2018. (https://www.amazon.com/Direct-Lighting-System-Circuit-Pendant-Adapter/dp/B07GYNC84R/ref=psdc_ 495224_t4_B07VC14BP7?th=1) (Year: 2018).
Amazon, "LAZ LED Pendant l ight", first available Dec. 9, 2019. (https://www.amazon.ae/LAZ-Pendant-Y-Shaped-Lampshade-lighti ng/dp/B082HVCNYJ) (Year: 2019).
Amazon, "Tetris Stackable Light", first available Apr. 4, 2017. (https://www.amazon.com/Tetris-Stackable-Light-Multicoloured/dp/B00IUQ2SYW) (Year: 2017).
Amazon, "WAC Lighting, H Track Right L Connector", first available Nov. 6, 2008. (https://www.amazon.com/WAC-Lighting-H L-RIGHT-WT-Track-Connector/dp/B000R7X1 SE?th=1) (Year: 2008).
Arch Daily, "LED Pendant Light—Acoustic T-Shaped", first accessed Feb. 6, 2023. (https://www.archdaily.com/catalog/us/products/32086/led-pendant-light-acoustic-t-shaped-alcon-lighting) (Year: 2023).
Esse-Ci Srl, ISDI_DIAMANTE (to the best of the Applicant's knowledge and understanding, the reference does not have a specific publication date but is believed to have been known by the Applicant on or after Dec. 1, 2017. Applicant believes it may have been available before the priority date of the application because the earliest date relating to this material that could be located online is Apr. 2017).
GES Lighting Track System, GES 1-Circuit Global Track System (To the best of the Applicant's knowledge and understanding, the reference does not have a specific publication date but is believed to have been known by the Applicant on or after Dec. 1, 2017. Applicant believes it may have been available before the priority date of the application because the earliest date relating to this material that could be located online is Jun. 2017).
Home Depot, "Hampton Bay White T-Connector", first available Sep. 16, 2014. (https://www.homedepot.com/p/questions/Hampton-Bay-White-T-Connector-for-Linear-Track-Lighting-EC701 WH/202051395/1) (Year: 2014).
Instagram, "axis lighting", first available Mar. 18, 2021. (https://www.instagram.com/p/CMkOgAvggBF/) (Year: 2021).
Lighting Services Inc., Recessed Track Installation (2015).
Lumenalpha™ spot, 209272, lumenpulse Global Tek 100 track system installation instructions (2016).
Lytespan Track lighting 9100 (1999).
Philips, Lytespan, Basic, 1 Circuit Track 6000 (2015).
WAC Lighting, J Series 2 Circuit Track (2012).

* cited by examiner

COUPLERS FOR LIGHT FIXTURES

REFERENCE TO CO-PENDING APPLICATIONS

This application is a Continuation-in-Part of co-pending U.S. application Ser. No. 17/369,613, filed 7 Jul. 2021, and is a Continuation of co-pending U.S. application Ser. No. 17/221,511, filed 2 Apr. 2021, which is a Continuation-in-Part of U.S. application Ser. No. 16/795,153, filed 19 Feb. 2020 (now U.S. Pat. No. 11,079,082), which is a Continuation of U.S. patent application Ser. No. 16/256,356, filed 24 Jan. 2019 (now U.S. Pat. No. 10,584,857), which is a Continuation of U.S. application Ser. No. 15/299,168, filed 20 Oct. 2016 (now U.S. Pat. No. 10,215,380). The disclosures set forth in the referenced applications are incorporated herein by reference in their entireties.

The disclosures set forth in the following applications are also incorporated herein by reference in their entireties:

U.S. Pat. App. No. 62/985,205, filed Mar. 4, 2020 and entitled LUMINAIRE STRUCTURE;

U.S. Pat. App. No. 62/820,083 filed Mar. 18, 2019 and entitled MOUNT INTERFACE FOR LIGHT FIXTURES; and U.S. patent application Ser. No. 16/723,665 filed Dec. 20, 2019 and entitled MOUNT INTERFACE FOR LIGHT FIXTURES.

FIELD OF THE DISCLOSURE

The present disclosure relates to light fixtures and other wall or ceiling mountable articles and, for example, to methods and devices for coupling adjacent units thereof in a light fixture installation.

BACKGROUND

Linear light fixtures are typically formed from aligned housings which are fastened together with coupling interfaces between them. While satisfactory for their intended purposes, conventional light fixture coupling interfaces tend to lack a degree of flexibility demanded by customers in response to emerging trends in interior design.

It would thus be desirable to provide novel approaches for joint interfaces to provide greater flexibility in light fixture design, or at least to provide the public with one or more useful alternatives.

SUMMARY

In an aspect, there is provided a coupler for coupling together adjacent housing sections of a light fixture housing assembly, comprising at least one first boundary including at least one male portion or part thereof, and at least one second boundary including at least one female portion or part thereof. The male and female portions are interoperable when the coupler is used in groups of at least two, to enable the female portion of a first of the couplers and secured in a first of the adjacent housing sections to receive the male portion of a second of the couplers secured in a second of the adjacent housing sections. Each of the male and female portions are configured to receive a locking latch to latch the female and male portions together, thereby to form the assembled light fixture housing.

In some exemplary embodiments, the female portion may include a channel portion defining pathway (or a part thereof contributing to the pathway) to receive the male portion. The channel may be, in some examples, three sided or four sided.

Some exemplary embodiments further comprise a central passage to receive a fastener for securing the coupler to a centrally disposed web in the corresponding housing section forming a mounting region for the coupler thereon.

In some exemplary embodiments, the channel portion may be configured to cooperate with the centrally disposed web, so that the web borders the pathway.

In some exemplary embodiments, the male portion may include at least one latch passage therein to receive the locking latch.

In some exemplary embodiments, the locking latch may be adjustably mounted on the female portion and moveable relative to and engageable with the latch passage.

In another aspect, there is provided a light fixture housing assembly, comprising at least two housing sections configured to form an end-to-end engagement, and at least two units of the coupler as defined in any one or more exemplary embodiments or aspects herein.

In another aspect, there is provided a method of assembling a light fixture housing assembly, comprising:

a. providing at least a pair of light fixture housing sections with complementary end regions to form a coupling interface therebetween, and a pair of couplers as defined in any one or more exemplary embodiments or aspects herein;
b. securing each of the couplers in a corresponding housing section, so as to present a corresponding exposed male portion, or part thereof, on a first of the housing sections and a receptive female portion, or part thereof, on a second of the housing sections;
c. engaging the male and female portions; and
d. deploying the locking latch to secure the male and female portions together.

In another aspect, there is provided a coupler unit for coupling together adjacent sections of a pair of articles at a coupling interface therebetween to form a coupled assembly, for mounting relative to a wall or ceiling, and configured to be used in units of two to form the coupling interface therebetween. The coupler unit comprises at least one first end with a coupling projection formed therein. The coupler unit is operable in a first mode to enable the coupling projection, and at least one opposite second end with a coupling receiver formed therein. The coupler unit is also operable in a second mode to enable the coupling receiver to receive an instance of the enabled coupling projection on an adjacent coupler unit in the first mode, wherein each coupler is configured to be installed in a corresponding one of the articles, with the enabled coupling projection received by the enabled coupling receiver and latched in position therewith to form the coupling interface.

In some exemplary embodiments, the enabled coupling receiver defines a pathway to receive the projection therein.

Some exemplary embodiments further comprise a locking latch removably mounted on the coupler in the second mode and adjacent the enabled coupling receiver.

In some exemplary embodiments, the enabled coupling receiver includes at least one passage in communication with the pathway, the latch including a portion to extend through the at least one passage to engage the enabled coupling projection when in the pathway.

In some exemplary embodiments, the receiver includes a channel portion providing three sides of the pathway.

In another aspect, there is provided a kit for joining together at least a pair of light fixture segments at a joint interface therebetween to form a light fixture assembly, comprising at least a pair of complementary coupling units. Each coupling unit is configured to be located in an operative position in one of the light fixture segments to join the other coupling unit at the joint interface defined by complementary abutment surfaces on the light fixture segments. At least one of the complementary coupling units is configured to be adjustably located in the operative position to displace another of the coupling units along a designated travel path toward a limit position, wherein the joining of the light fixture segments at the joint interface occurs in advance of the other coupling unit reaching the limit position.

In some exemplary embodiments, the limit position is associated with a designated landmark on at least one coupler unit.

In some exemplary embodiments, the at least one coupling unit is a drive coupling unit and the other coupling unit is a follower coupling unit, wherein the drive coupling unit includes a designated landmark, and the operative position for the drive coupling unit is selectable along a position path on the light fixture segment with the designated landmark visually misaligned relative to the corresponding abutment surface.

In some exemplary embodiments, the drive coupling unit includes at least one female portion or a part thereof, and the follower coupling includes at least one male portion or a part thereof.

In some exemplary embodiments, drive coupling unit includes an actuator element which is responsive to an actuation force to engage and displace the follower coupling unit toward the limit position.

Some exemplary embodiments further comprise the light fixture segments.

In some exemplary embodiments, the light fixture segments are selected from one or more of a first group of segments with one or more light sources, and a second group of segments without one or more light sources.

In some exemplary embodiments, the second group includes one or more segments configured to join or to anchor one or more segments of the first group.

In some exemplary embodiments, the segments of the second group include at least two coupling units, each for joining another coupling unit on a segment of the first group at a corresponding joint interface.

In another aspect, there is provided a light fixture segment comprising a drive coupling unit as defined in any one or more or exemplary embodiments or aspects herein.

In another aspect, there is provided a light fixture segment comprising a follower coupling unit as defined in any one or more exemplary embodiments or aspects herein.

In another aspect, there is provided a light fixture assembly comprising a kit as defined in any one or more exemplary embodiments or aspects herein.

In another aspect, there is provided a method of assembling together at least a pair of light fixture segments at a joint interface therebetween to form a light fixture assembly. The method comprises:

a. providing at least a pair of complementary coupling units, each coupling unit configured to be located in an operative position in one of the light fixture segments to join the other coupling element at the joint interface defined by complementary abutment surfaces on the lighting fixture segments;
b. locating at least one of the coupling units in the operative position in one of the light fixture segments, with at least one other of the coupling units positioned in the other of the light fixture segments; and
c. actuating the at least one coupling unit to draw the at least one other coupling unit along a designated travel path toward a limit position to form the joint interface, wherein the joining of the light fixture segments at the joint interface occurs in advance of the at least one other coupling unit reaching the limit position.

In another aspect, there is provided a modular kit for assembling at least a pair of light fixture modules at a joint interface therebetween to form a light fixture assembly, comprising at least a pair of complementary coupling units, each coupling unit configured to be located in an operative position in one of the light fixture modules to join another coupling unit at the joint interface defined by complementary abutment surfaces on the lighting fixture modules. At least one of the coupling units is configured to be adjustably located in the operative position and to displace the other of the coupling units along a designated travel path toward a limit position, wherein the joining of the light fixture modules at the joint interface occurs in advance of the other coupling unit reaching the limit position.

Some exemplary embodiments may further comprise one or more of the light fixture modules, which may are selected from one or more of a first group of modules with one or more light sources, and a second group of modules without one or more light sources.

In some exemplary embodiments, each of the modules in the second group includes at least one coupling unit for coupling with at least one complementary coupling unit in a corresponding at least one module of the first group.

In another aspect, there is provided a junction device for joining adjacent housing sections of a light fixture housing assembly, comprising a junction body structure formed from at least one junction body segment. A plurality of coupling units is provided, each with at least one first boundary including at least one male portion or part thereof, or at least one female portion or part thereof. The male and/or female portions or parts thereof are configured to enable each corresponding female portion or a part thereof of a first of the coupling units or one of the housing sections to receive the male portion or a part thereof of a second of the coupling units or one of the housing sections. Each of at least two of the coupling units includes a first segment integrally formed with the at least one junction body segment at respective first boundaries with the corresponding male or female portions or respective parts thereof extending therefrom. At least one of the male and female portions or parts thereof is configured to be associated with a first locking structure to lock the female and male portions or parts thereof together, thereby to form the assembled light fixture housing.

In some exemplary embodiments, each of the male and/or female portions or parts thereof of the least two coupling units may include a first surface, and may further comprise a second segment with a second surface adjacent the first surface and configured to strengthen the corresponding one of the at least two coupling units.

In some exemplary embodiments, the first segments of the at least two coupling units may be molded with the at least one junction body segment to form the junction body structure, with a corresponding region defined adjacent each of the male and/or female portions or parts thereof thereon presenting the first surface to receive the second segment at the second surface.

In some exemplary embodiments, the at least one junction body segment further may comprise a passage adjacent a corresponding region to receive a fastener therein to removably anchor the second segment thereto.

In some exemplary embodiments, the second segment may include a plate structure configured to extend along the region in contact with the first segment, wherein the plate structure may have a periphery configured to match, or to be complementary with, a corresponding profile of the region.

In some exemplary embodiments, the plate may include a pair of opposed notches to receive corresponding projections of the junction body structure.

In some exemplary embodiments, the junction body structure may include a first closed section and a second open section, with a cover structure removably attachable to the second open end section.

In some exemplary embodiments, the male portion may include at least one second locking structure to receive the first locking structure.

In some exemplary embodiments, the first locking structure may include a latch structure and the second locking structure includes a latch passage.

In some exemplary embodiments, the latch structure may be adjustably mounted on the female portion or part thereof, and moveable relative to and engageable with a surface adjacent the latch passage.

In another aspect, there is provided a light fixture housing assembly, comprising at least two housing sections configured to form an end-to-end engagement, and at least one instance of the junction as defined in any claim, clause, example or in elsewhere in the present disclosure.

In another aspect, there is provided a plate structure as defined in any claim, clause, example or in elsewhere in the present disclosure.

In another aspect, there is provided a method of assembling a light fixture housing assembly, comprising:

- providing at least a pair of light fixture housing sections with complementary end regions to form a coupling interface therebetween, and at least one junction device as defined in any claim, clause, example or in elsewhere in the present disclosure;
- securing each of the light fixture housing sections with the junction device, by engaging an exposed male portion, or part thereof, on one or more of the housing sections and the junction device, with a receptive female portion, or part thereof, on a corresponding one or more of the housing sections and the junction device; and
- deploying the locking structure to secure the male and female portions together.

In another aspect, there is provided a junction device for joining together adjacent housing sections of a light fixture housing assembly, comprising a plurality of coupling units. Each coupling unit may include at least one first boundary including at least one male portion or part thereof, or at least one female portion or part thereof. The male and/or female portions of each coupling unit may be configured to engage corresponding female and male portions respectively in a respective plurality of the housing sections, and to enable each corresponding female portion of a first of the coupling units or the housings to receive the male portion of a second of the coupling units or the housings. Each of the male and female portions may be configured to receive a locking structure to lock the female and male portions together, thereby to form the assembled light fixture housing.

Some exemplary embodiments may further comprise a junction body, having a first closed section and a second open section, with a cover removably attachable to the second open end section.

In some exemplary embodiments, the female portion may include a channel portion defining a pathway to receive the male portion.

In some exemplary embodiments, the channel portion may be three sided.

In some exemplary embodiments, the male portion may include at least one passage therein to receive the locking structure.

In some exemplary embodiments, the locking structure may be adjustably mounted on the female portion and moveable relative to and engageable with a surface adjacent the passage.

Some exemplary embodiments may further comprise at least two housing sections configured to form an end-to-end engagement, and at least one instance of the junction as defined in any claim, clause, example herein.

In another aspect, there is provided a method of assembling a light fixture housing assembly, comprising:

- providing at least a pair of light fixture housing sections with complementary end regions to form a coupling interface therebetween, and at least one junction device as defined in any claim, clause, example or in elsewhere in the present disclosure;
- securing each of the light fixture housing sections with the junction device, by engaging an exposed male portion, or part thereof, on one or more of the housing sections and the junction device, with a receptive female portion, or part thereof, on a corresponding one or more of the housing sections and the junction device; and
- deploying the locking latch to secure the male and female portions together.

In another aspect, there is provided a coupler for physically coupling together without electrically connecting adjacent housing sections of a light fixture housing assembly, comprising a plurality of coupling units. Each of the coupling units may be provided with at least one first boundary including at least a portion of one male portion with an aperture therethrough, or at least a portion of one female portion. The male and/or female portions of each coupling unit may be interoperable with corresponding female and male portions respectively in a respective plurality of the housing sections, and to enable each corresponding female portion of a first of the coupling units or the housing sections to receive the male portion of a second of the coupling units or the housing sections. Each of the male and female portions may be configured to receive a locking structure to lock the female and male portions together, thereby to form the assembled light fixture housing.

In some exemplary embodiments, the female portion may include a channel portion defining a pathway to receive the male portion.

In some exemplary embodiments, the channel portion may be three sided.

In some exemplary embodiments, the channel portion may be configured to cooperate with a centrally disposed web, so that the web borders the pathway.

In some exemplary embodiments, the aperture of the male portion may define at least one passage therein to receive the locking structure.

In some exemplary embodiments, the locking structure is adjustably mounted on the female portion and moveable relative to and engageable with a surface adjacent the passage.

BRIEF DESCRIPTION OF THE FIGURES

Several exemplary embodiments of the present disclosure will be provided, by way of examples only, with reference to the appended drawings, wherein.

DETAILED DESCRIPTION

Figure 1:
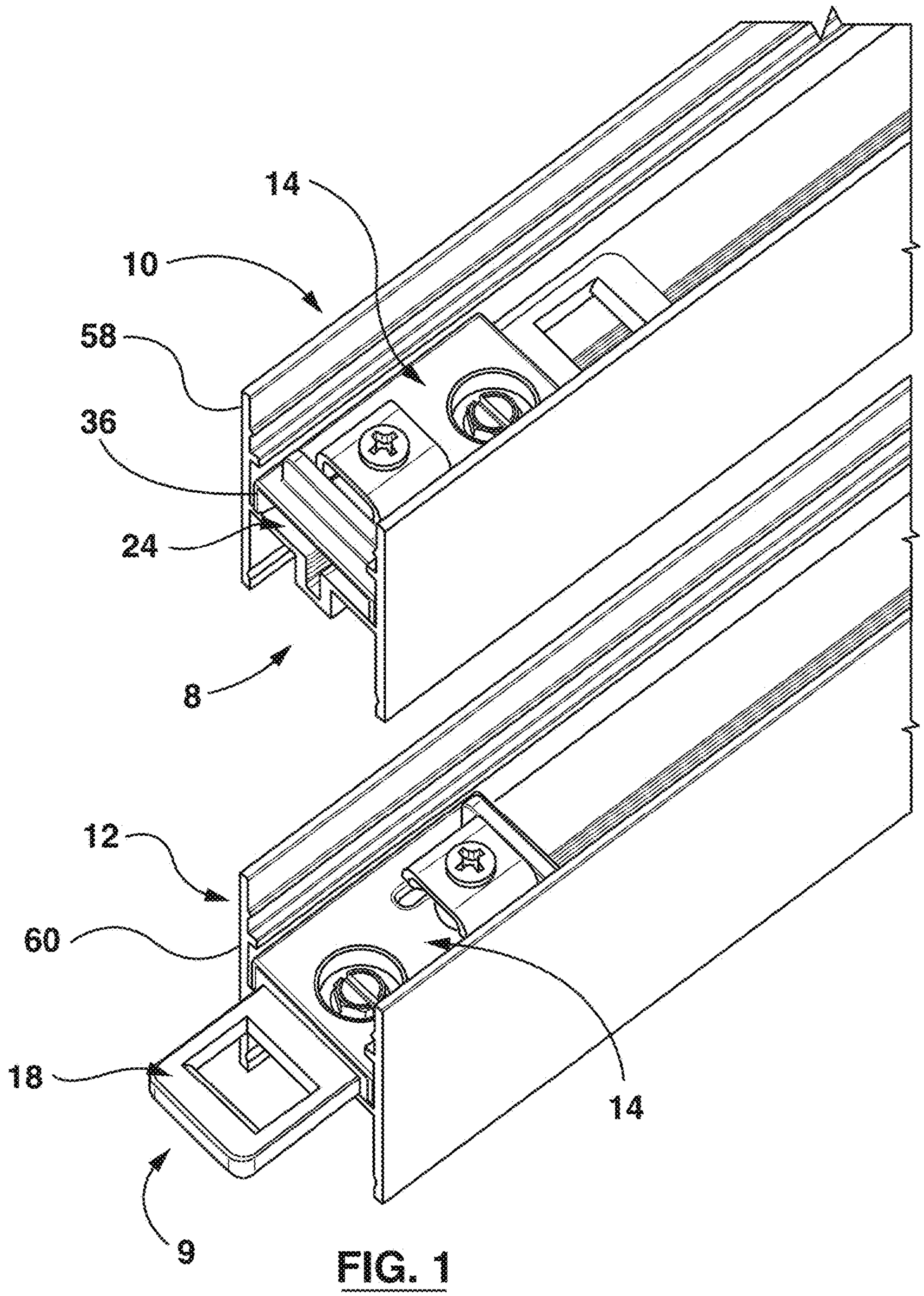
FIG. 1 is a fragmentary perspective view of adjacent sections of an exemplary light fixture housing assembly.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure.

Figure 2:
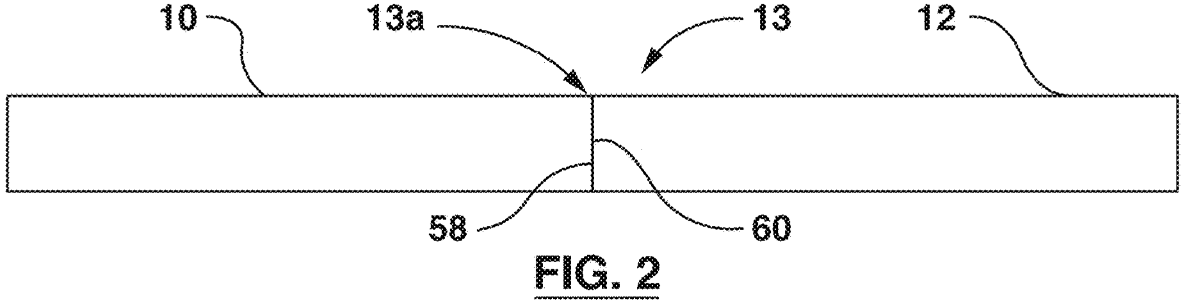
FIG. 2 is a side view of the light fixture housing assembly of FIG. 1.
Figure 3:
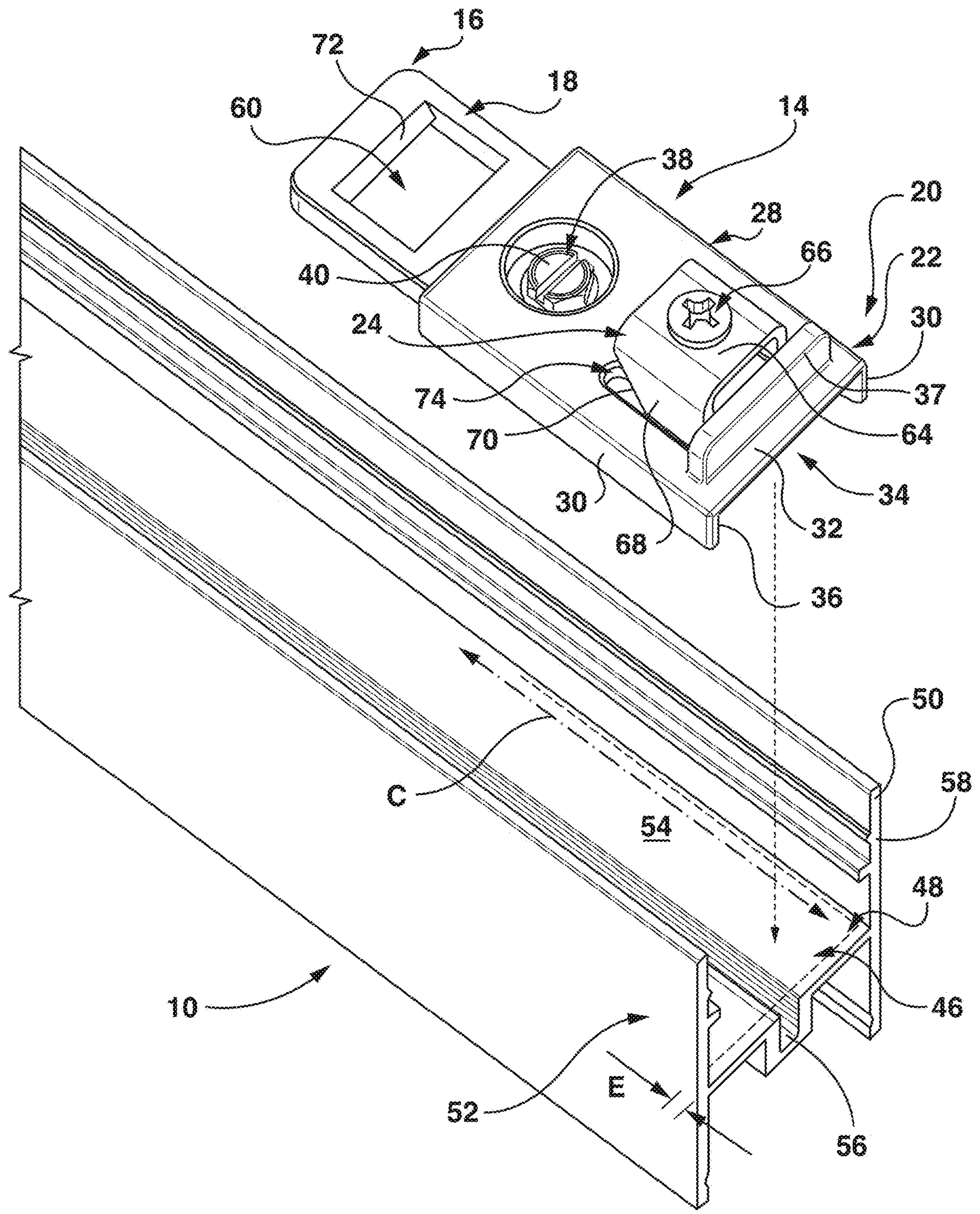
FIG. 3 is a fragmentary perspective assembly view of one section of FIG. 1.

FIGS. 1 and 2 show, in an exemplary embodiment, a group of two adjacent housing sections 10, 12 which are to be assembled to form a light fixture housing assembly 13 at a joint interface 13*a*. Each of a pair of couplers 14 is installed in a corresponding housing section 10, 12. Referring to FIG. 3, each coupler 14 has a first boundary 16 including first coupling unit in the form of a male portion 18 and a second boundary 20 including a second coupling unit in the form of a female portion 22. As will be described, the male and female portions 18 and 22 are interoperable when the coupler 14 is used in groups of at least two, to enable the female portion 22, of a first of the couplers secured in the housing section 10, to receive the male portion 18 of a second of the couplers secured in the adjacent housing section 12. A locking latch 24 is provided to latch together the male portion 18 of one of the couplers with the female portion 22 of the other coupler, thereby to form the assembled light fixture housing 13. In this case, the locking latch 24, together with the male and female portions 18, 22 are contained in or on the coupler 14.

The female portion 22 includes a channel portion 28 formed by a pair of side walls 30 and a top wall 32 to define a pathway 34 to receive the male portion 18 of another coupler 14. Thus, the female portion 22 may be considered, in this example, to form three sides of the pathway 34. The female portion 22 also has a periphery 36, which may provide a designated landmark, for installing the coupler 14 on the housing section 10 as shown in FIG. 1, as discussed below.

Figure 4:
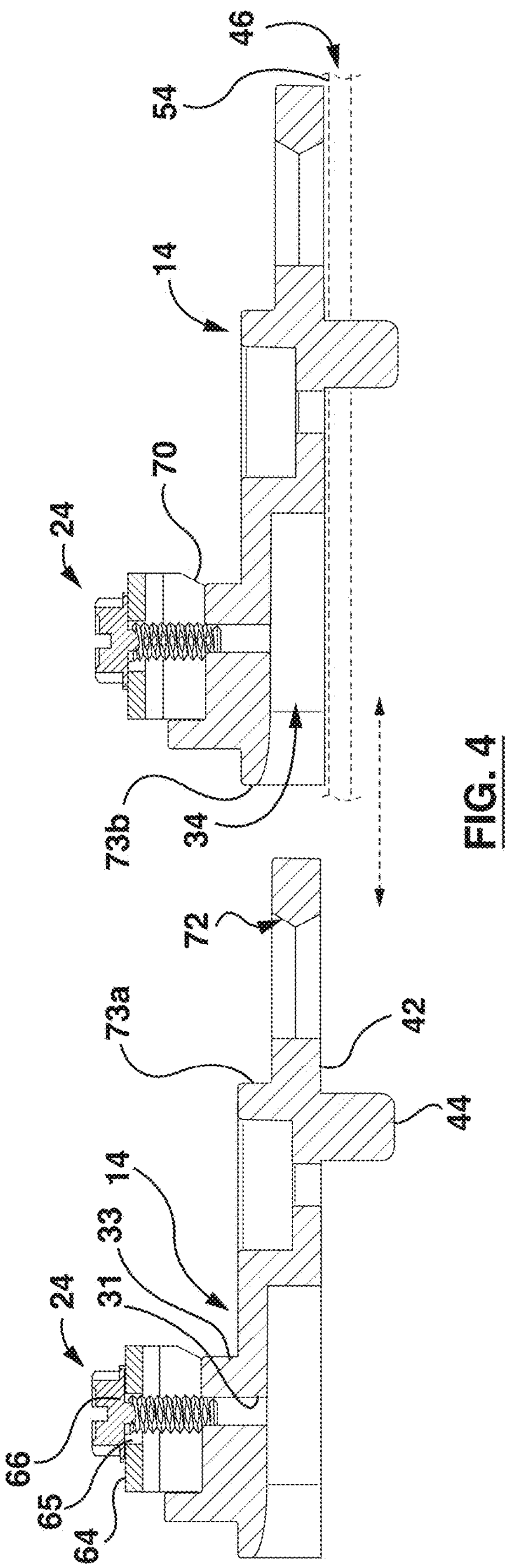
FIGS. 4 and 5 are side views of a pair of couplers in the light fixture assembly of FIG. 1, in isolation, in successive operative positions.

The coupler 14 further comprises a central passage 38 to receive a fastener 40 for securing the coupler 14 to a centrally disposed web 46 in the corresponding housing section 10 forming a mounting region 48 for the coupler 14 thereon. In this case, the web 46 extends between a pair of upright wall sections 50, 52. The web 46 provides a surface 54 with a recess 56 formed therein to receive the fastener 40. Thus, the channel portion 28 is configured to cooperate with the centrally disposed web 46, at the surface 54, so that the web 46 also borders the pathway 34. In this case, as seen in FIG. 4, the coupler 14 has a surface 42, which engages the surface 54, while an alignment projection 44 projects from the surface 42, also to extend into the recess 56, to further align the coupler thereon.

Referring to FIGS. 1 to 3, the housing sections 10, 12 have corresponding end faces 58, 60 which engage one another at the joint interface 13*a*.

Thus, in this exemplary embodiment, both the projection 44 and the fastener 40 penetrate the recess 56, though in other cases, the coupler 14 may be secured to the web 46 in other ways, such as without the need for the projection 44, and/or by way of other fasteners extending from the web 46 and through the surface 42, as examples. Still further, extruded engaging sections may be provided in the walls of the housing sections to receive and anchor the coupler 14, with or without fasteners. Adhesives and other bonding techniques may also, in some cases, be deployed to secure the coupler 14 to the corresponding housing section.

Referring to FIG. 3, the male portion 18 includes a latch passage 60. The locking latch 24 is adjustably mounted on the female portion 22 and moveable relative to and engageable with the latch passage 60 to secure the male portion 18 with the female portion 22. In this case, the locking latch 24 has a central portion 64 with a passage 65 (FIG. 4) which receives a fastener 66 which in turn is threadably engaged with a passage 31 in a shoulder region 33 on the top wall 32 to adjust the position of a pair of legs 68 (FIG. 3) depending from the central portion 64.

The legs 68 have inclined contact edge regions 70 which are configured to engage a complementary edge region 72 bordering the latch passage 60 on the male portion 18. The legs 68 each extend through a corresponding window 74 and moveable, under the action of the fastener 66, to travel between an un-interrupting position (as seen on the left hand side as viewed in FIG. 5) and an interrupting position (as seen on the right hand side as viewed in FIG. 5) relative to the pathway 34.

Also mounted on the top wall 32 is an upstanding alignment wall 37, which may be provided, for example, to provide a guard for the latch member 24.

The function of the locking latch 24 may, in some exemplary embodiments be provided by or with different structures, such as other movable structures which engage different structures between the male and female portions, or parts thereof and/or providing a locking or latching bias in other ways beyond the use of the fastener 40, such as by the use of springs, magnets, levers, clamps, spring clips, and the like.

Figure 5:
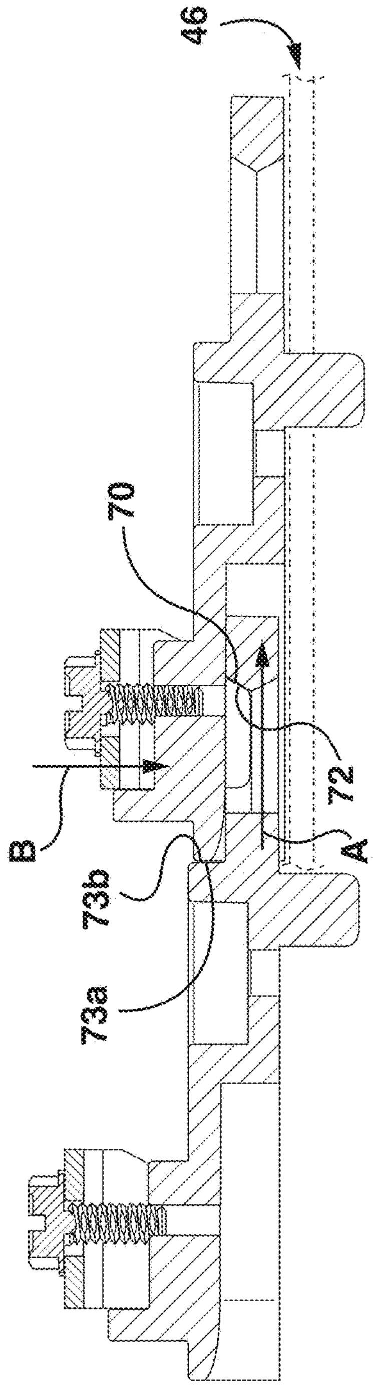
Figure 6:
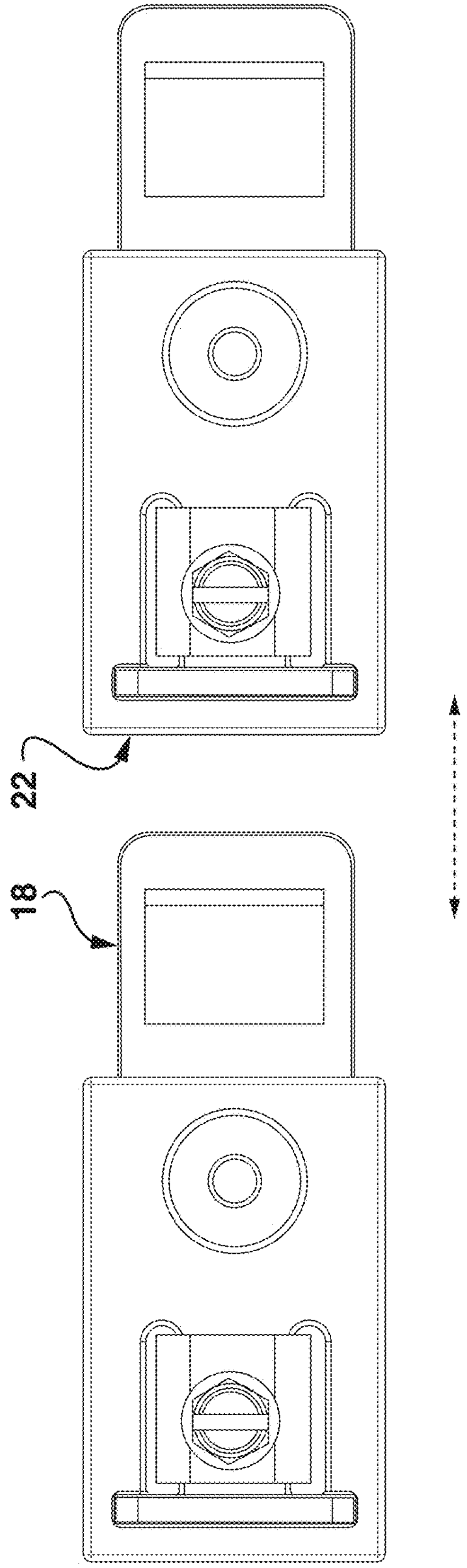
FIGS. 6 and 7 are plan views according to FIGS. 4 and 5.
Figure 7:
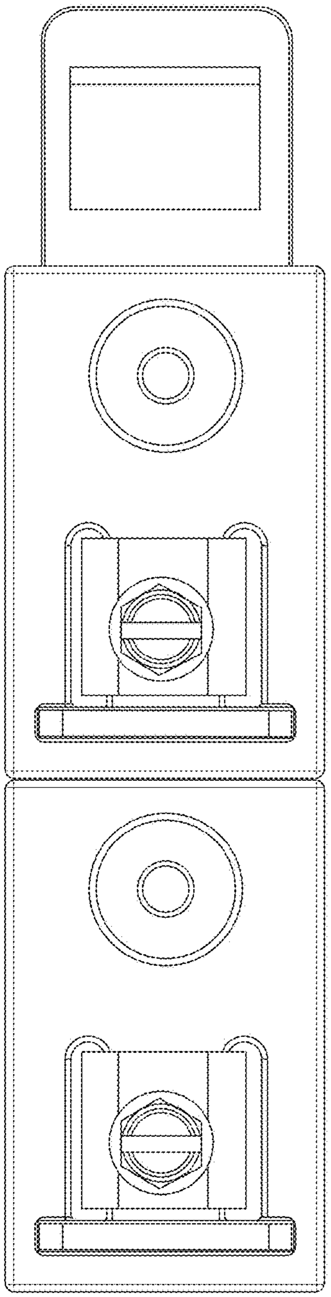

Thus, referring to FIG. 5, when the male portion 18 is present in the pathway 34 and the contact edge region 72 is in a position to engage the contact edge region 70, such movement toward the interrupting position engages the respective contact edge regions 70 and 72. Their complementary angles further cause the male portion 18 to be drawn into the pathway 34 (arrow A) to a designated engaged or assembled position, dictated by the positions of the contact edge regions 70, 72 when the locking latch 24 has been delivered to its fully engaged position (arrow B), as may be determined by the relative positions of the central portion 64 and the shoulder 33, or when the fastener 66 has been turned to a designated tight configuration, or other designated condition.

In the exemplary embodiment of FIG. 4, both couplers 14 are provided with locking latches 24. In other situations, those units of the coupler 14 that are in the first mode, that is they are to be secured to function as male portions, may be thus provided without the locking latches 24, since such locking latches 24 will be redundant (and thus not included on the left hand coupler in FIGS. 11 and 12).

FIG. 5 shows an exemplary configuration in which the left hand coupler 14 (in the first mode) is shown to have reached a limit position relative to the right hand coupler 14 (in the second mode) by the corresponding abutment limit surfaces 73*a*, 73*b* in contact, thus preventing any further movement of the left hand coupler toward the right hand coupler, in the direction of arrow A. However, as will be described, the right hand coupler 14 (in the second mode) may be configured when positioned in the housing section 10, so that the joint interface 13*a* is established in advance of (or before) reaching such limit position.

The coupler 14 in the second mode may thus be installed in the housing section at substantially any location along an operative distance from the corresponding end face 58, such as shown by arrow C of FIG. 3, owing to, in this example, the recess 56 extending away from the end face 58 and configured to threadably engage fastener 40 within a designated distance from the end face 58, without the need for a precise location for the coupler 14. This enables the coupler 14 to be positioned (as shown schematically in dashed lines) on the web 46 at a position relative to the end face 58, using the landmark as a guide, so that periphery 36 of the coupler is effectively misaligned with (or inwardly offset relative to) the end face 58, as shown by dimension E. This misalignment or inward offset has the effect of extending the limit position beyond the point at which the end faces 58 and 60 meet to complete the joint interface 13*a*, which would thus occur before the abutment limit surfaces 73*a*, 73*b* on the couplers 14 make contact. This has the benefit of allowing an assembler to make a sighting of the landmark periphery 36, for example, with the end face 58 and provide a notional inward offset. In this case, the landmark periphery 36 is convenient since it may be relatively easy for the assembler to discern that an outward offset (i.e. the landmark periphery 36 being outside relative to the end face 58) or a flush alignment of the landmark periphery and the end face 58 may result in the joint interface not being substantially firmly established with sufficient compressive forces between the end faces 58 and 60, whereas an inward offset within a relatively straightforward range, for example in the order of from about 0.4 mm to about 1.5 mm (though other spacings, such as larger spacings may also be useful in some cases) may provide a firmly established joint interface.

In some exemplary embodiments, the coupler 14 in the second mode may be secured in position while the other coupler 14 in the first mode may be adjustably positioned in the manner discussed above. For instance, the female portion may be provided with an interior latch surface against which a latching male member may engage and then draw the housing segments together at the joint interface.

Figure 10:
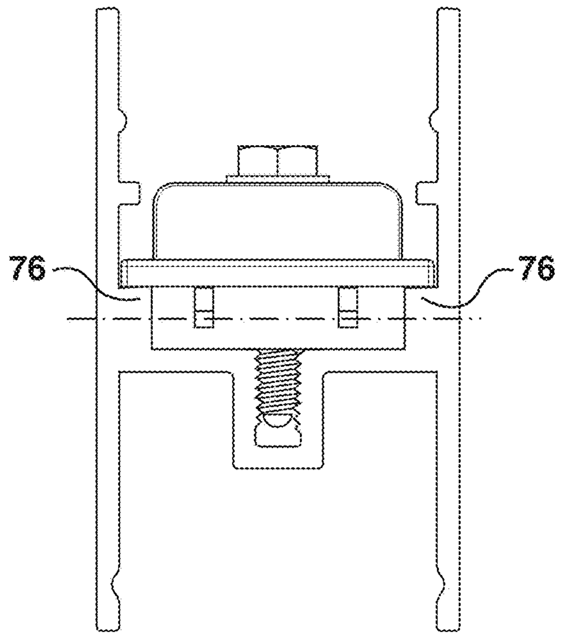
FIG. 10 is an end view, according to FIG. 8, of another exemplified light fixture housing assembly.

Referring to FIG. 3, the channel portion 28, in this case, is three sided, though it may be formed in other configurations. For instance, it may be four sided to form a self-contained pathway 34. Alternatively, the pathway 34 may be provided by a top wall 32 without the side walls 30, whose function may otherwise be provided by upstanding walls or other supporting structures, such as those shown at 76 in FIG. 10, which may be formed integrally with, or provided in, the corresponding housing section, to be adjacent the surface 54, to provide sufficient height for entry of the male portion 18 into the pathway 34.

Figure 8:
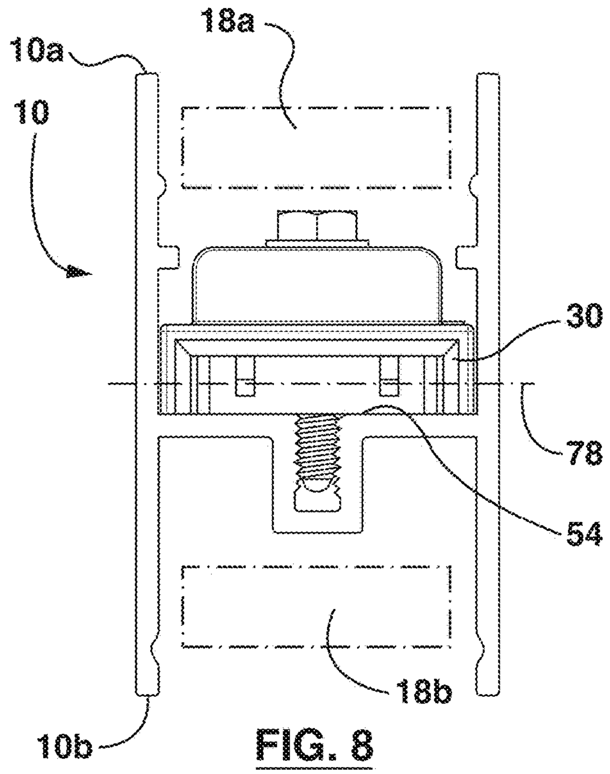
FIGS. 8 and 9 are end views taken on arrows 8 and 9 of FIG. 1.
Figure 9:
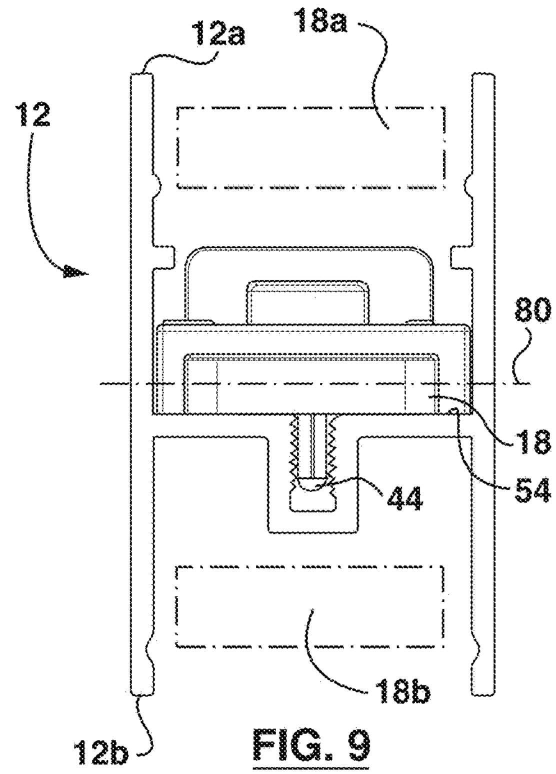

As can be seen in FIG. 8, the surface 54 is positioned, and the walls 30 are so dimensioned, that the resulting pathway 34 has a central line 78 which corresponds with a corresponding central line 80 of the male portion 18 (as seen in FIG. 9) and is symmetrical with the upper and lower boundaries 10*a*, 10*b*, 12*a* and 12*b* of the sections 10, 12, which allows the sections 10, 12 to be assembled in two possible configurations based on the reversing ability afforded by the configurations of the housing sections, relative to each corresponding surface 54. Of course, the same reversing ability may be utilized in cases where the upper and lower boundaries may desirably be aligned, or for that matter misaligned, with the respective boundaries of the neighboring sections. Thus, in some exemplary embodiments, the coupler 14 provides a dual function, as at least part of a male portion (in a first mode) or a female portion (in a second mode), or a part thereof, in a joint interface of a light fixture housing assembly. Thus, as viewed in FIG. 8, the upper and lower regions of the housing sections 10 and 12 may include optic (or light emitting) modules, such as LED arrays and the like, as illustrated schematically at 18*a* or non-optic (or non-light emitting) modules such as wiring, power supplies including ballasts and the like, as illustrated schematically at 18*b*. Further, in some example embodiments, power may be transferred between such LED arrays and/or power supplies and the like from one housing section by feeding power cables or the like through the junction interface through spaces therein adjacent the couplers 14, without requiring the couplers to conduct the power through the interface, or to electrically connect adjacent housing sections of a light fixture housing assembly.

Thus, in some exemplary embodiments, the light fixture housing assembly 13 may be formed using the two housing sections 10, 12 and the coupler 14 (or parts thereof) in groups of two or in multiples thereof, with a pair of couplers 14 (or parts thereof) for each interface between a pair of end regions on the housing sections to be joined. The light fixture housing assembly 13 may be assembled with other housing sections or, for that matter, other light fixture assemblies, where each interconnection involves a pair of the couplers 14. Thus, the coupler 14, in some exemplary embodiments, may serve as a universal or interoperable coupling attachment unit which may be arranged in two configurations, one as a male portion (in a first mode) to extend into the pathway of an adjacent light fixture assembly or housing section, or as a female portion in the alternative configuration (in a second mode), either to provide the pathway, or to cooperate with the corresponding housing section or light fixture assembly to provide the pathway to receive a male portion of an adjacent housing section or light fixture assembly.

Thus, in use, one of the couplers 14 may be installed on the housing section 12 in a first mode with an enabled male portion, as shown in FIG. 1, that is with the male portion extending from the housing section 12. To do so, the coupler 14 is oriented with the channel portion 28 oriented so that the pathway 34 is open to the surface 54 and the passage 38 aligned with the recess 56 the fastener 40 to installed therein. Similarly, a second of the couplers 14 may be installed on the housing section 10 in a second mode with an enabled female portion, as shown in FIG. 1, that is with the female portion in a receptive configuration in the housing section 10, and placed in similar fashion with the channel portion 28 oriented so that the pathway is open to the surface 54 and the passage 38 aligned with the recess 56 for the fastener 40 to be installed therein and, if desired, the inward offset according to arrow E. The housing sections thus are aligned and the male enabled male portion 18 is passed into the enabled female portion 22 as shown by the sequential views in FIGS. 4 and 5.

Figure 11:
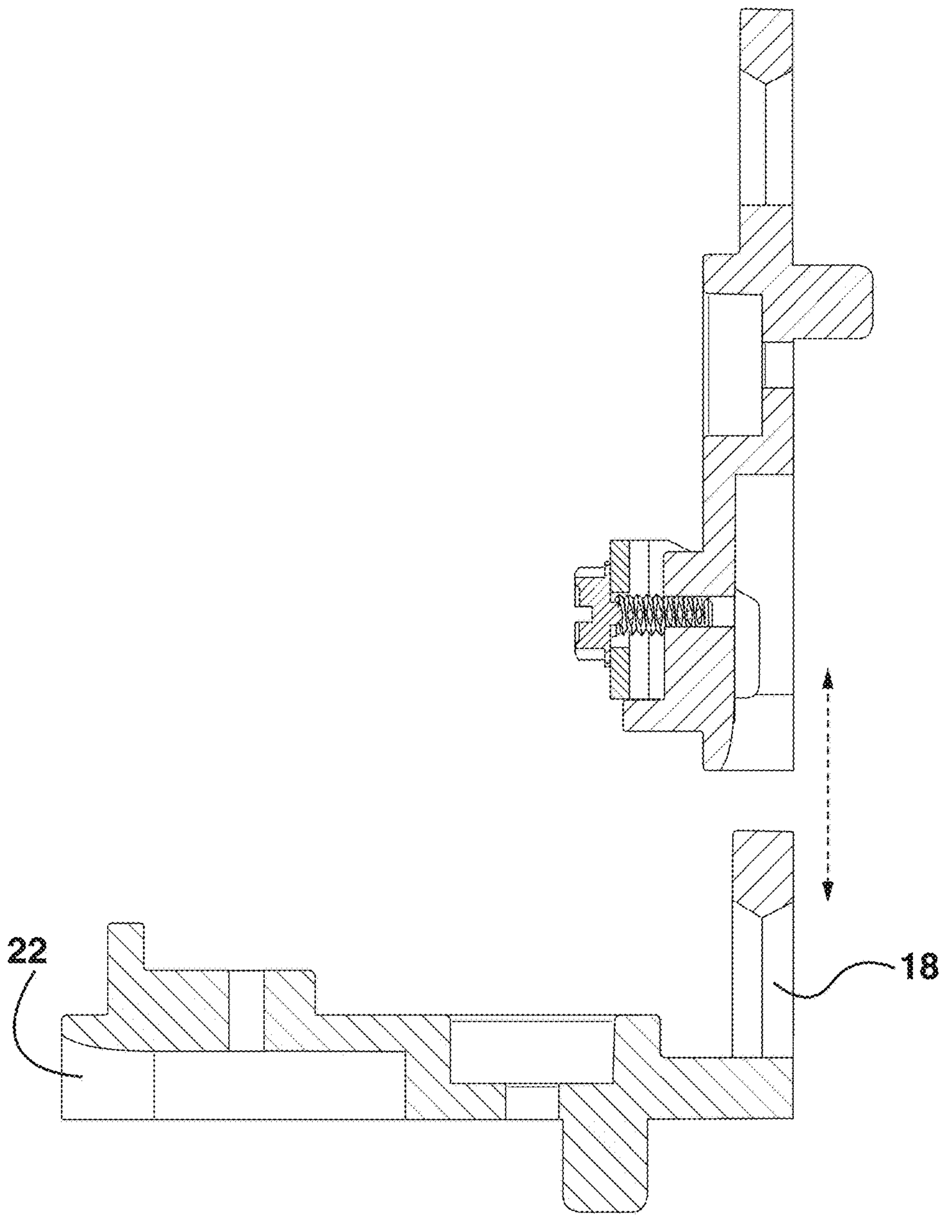
FIGS. 11 and 12 are side views of alternatives to the portions shown in FIGS. 4 and 5
Figure 12:
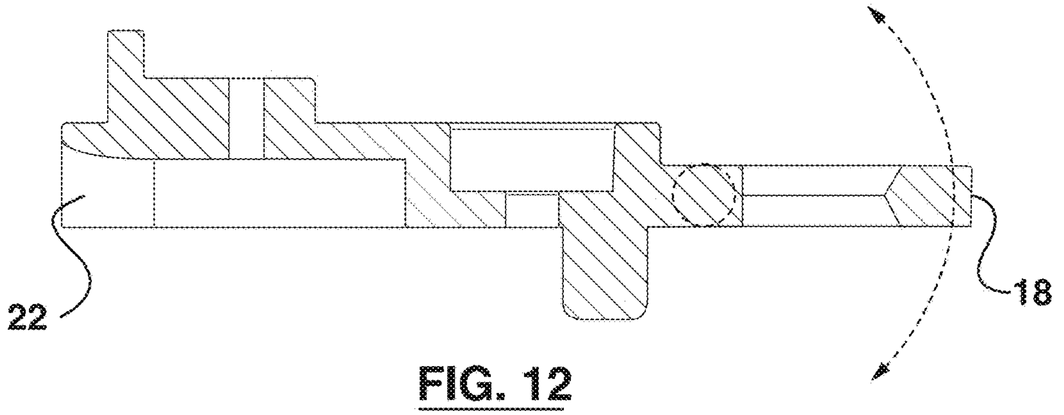
Figure 13A:
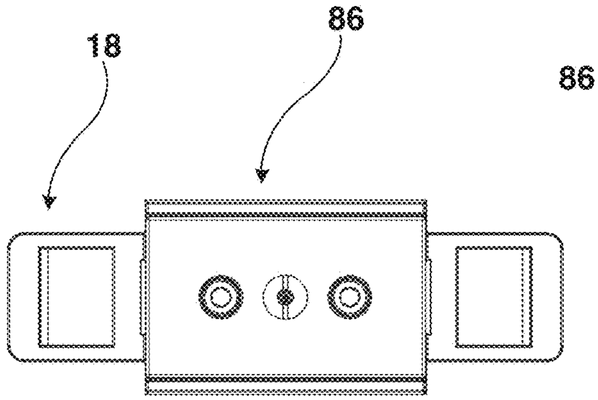
FIGS. 13*a* to 13*d* are top, side and perspective views of a first junction for a light fixture assembly.
Figure 13B:
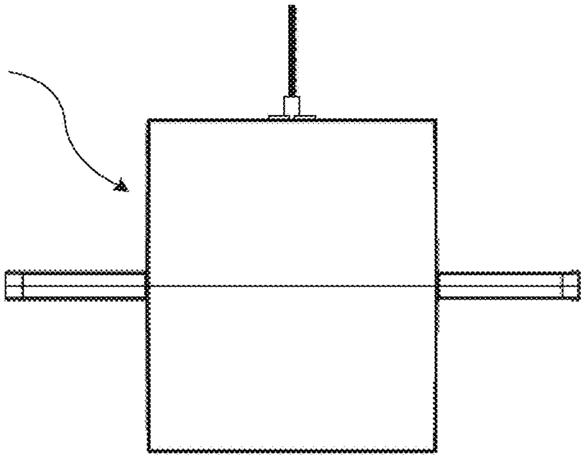
Figure 13C:
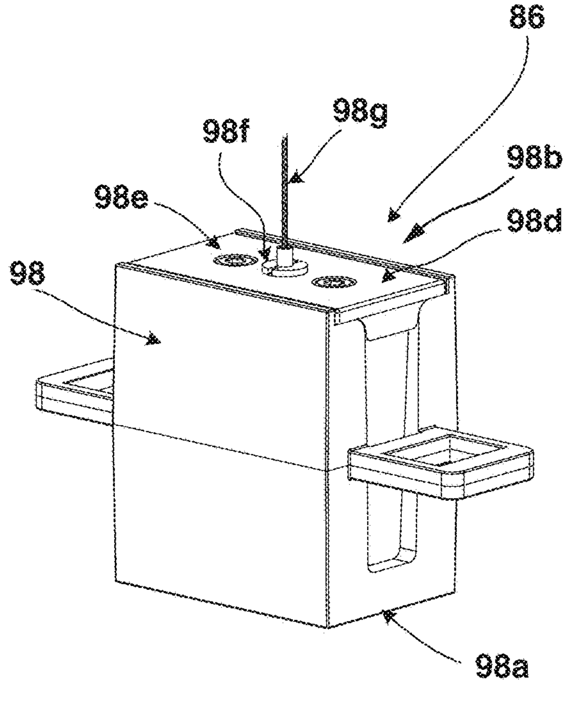
Figure 13D:
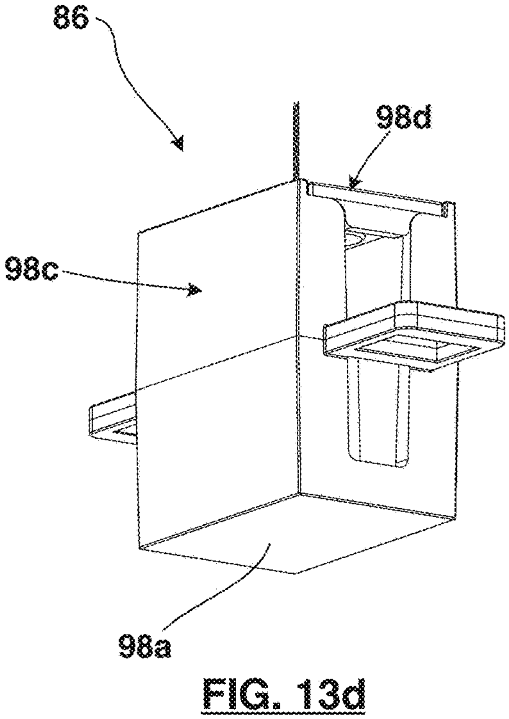
Figure 14A:
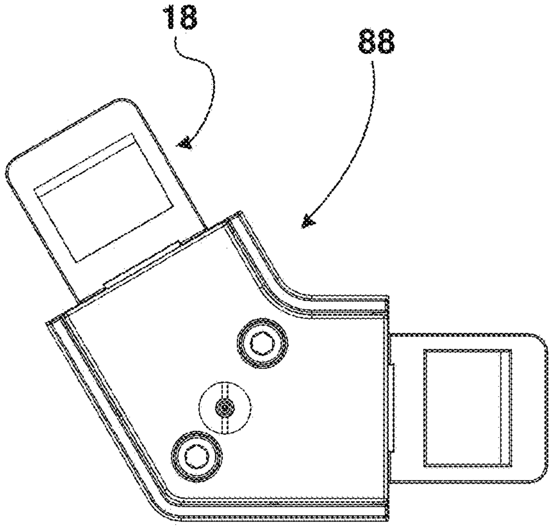
FIGS. 14*a* to 14*d* are top, side and perspective views of a second junction for a light fixture assembly.
Figure 14B:
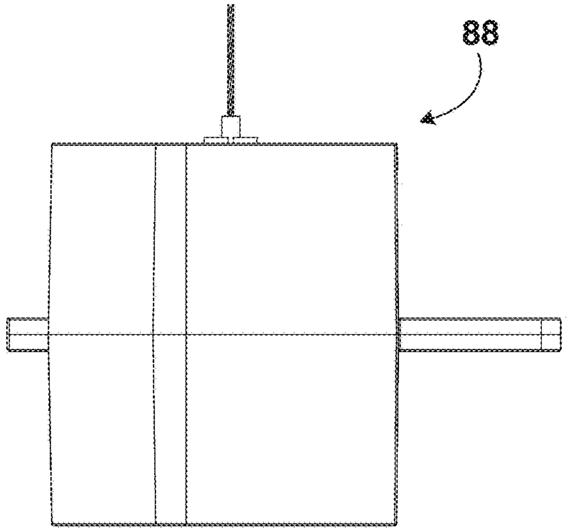
Figure 14C:
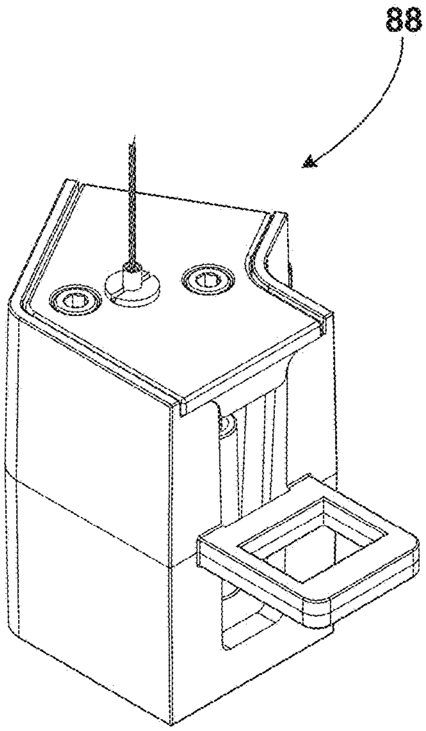
Figure 14D:
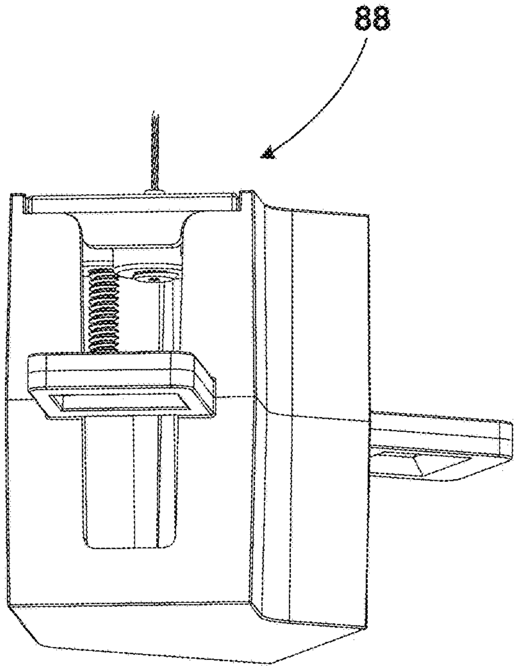
Figure 15A:
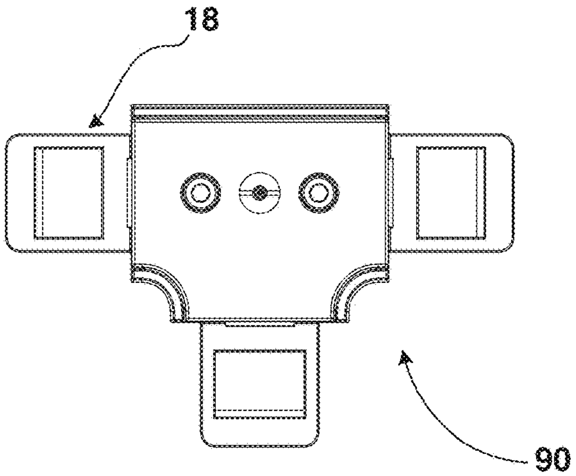
FIGS. 15*a* to 15*d* are top, side and perspective views of a third junction for a light fixture assembly.
Figure 15B:
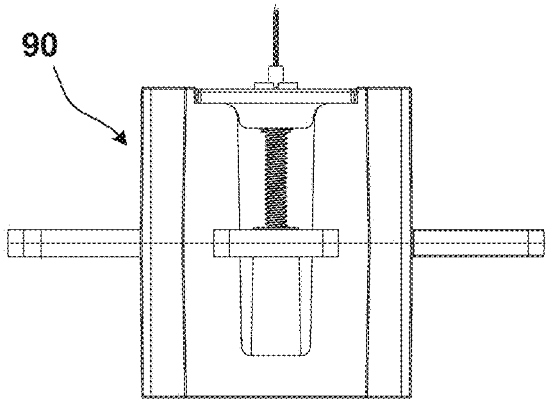
Figure 15C:
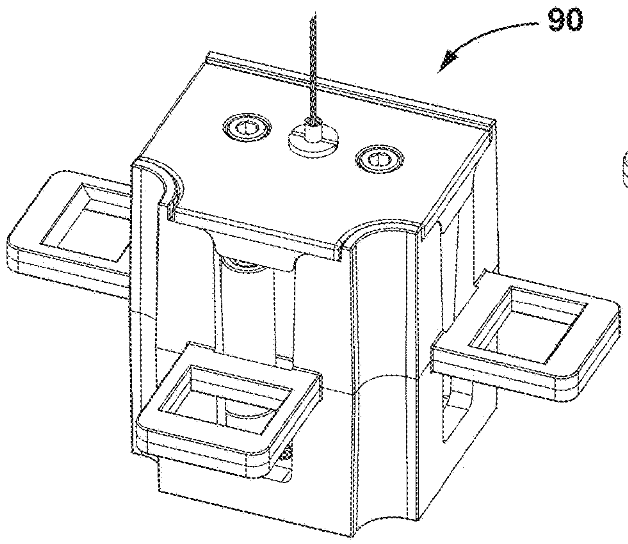
Figure 15D:
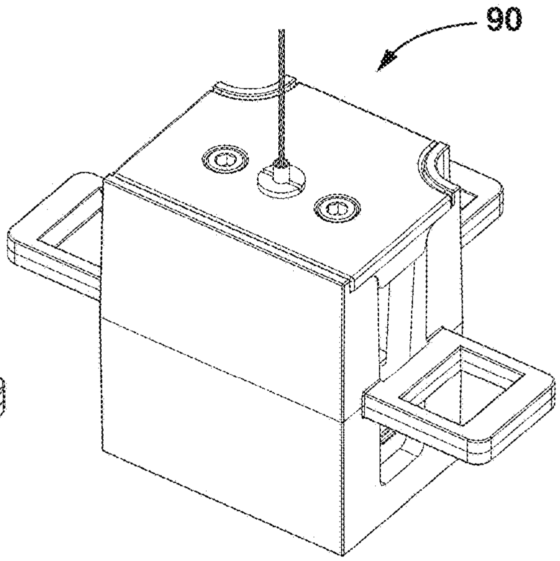
Figure 16A:
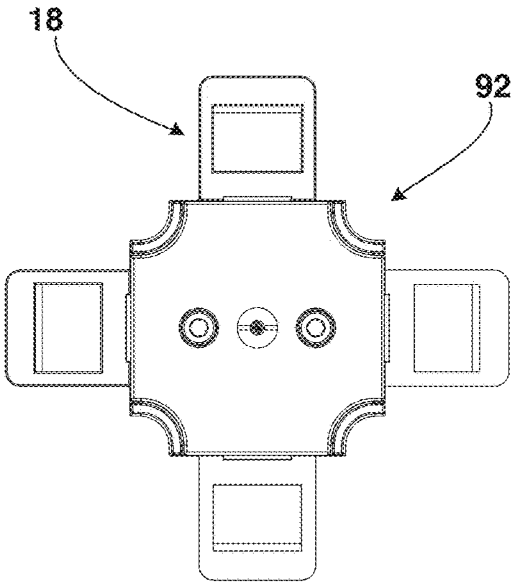
FIGS. 16*a* to 16*d* are top, side and perspective views of a fourth junction for a light fixture assembly.
Figure 16B:
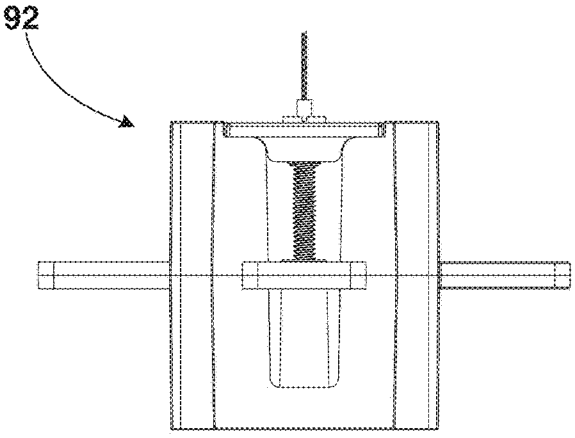
Figure 16C:
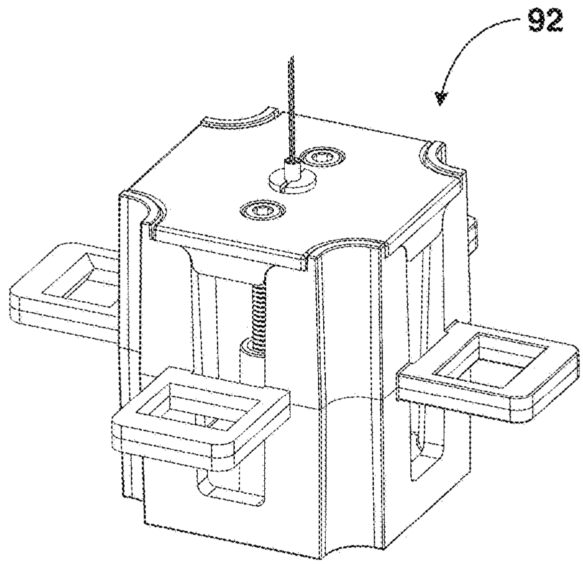
Figure 16D:
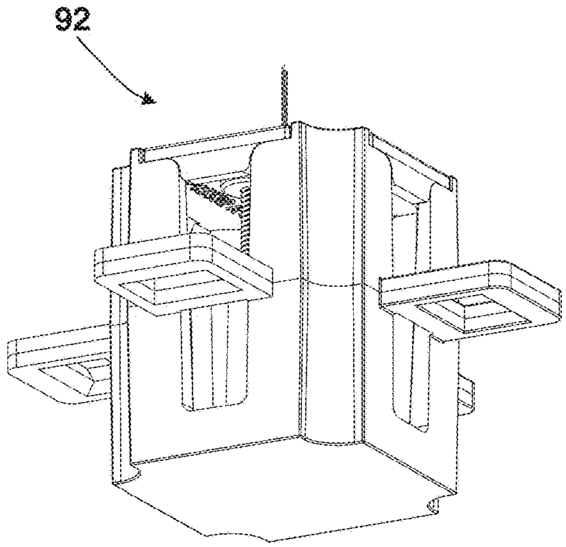
Figure 17A:
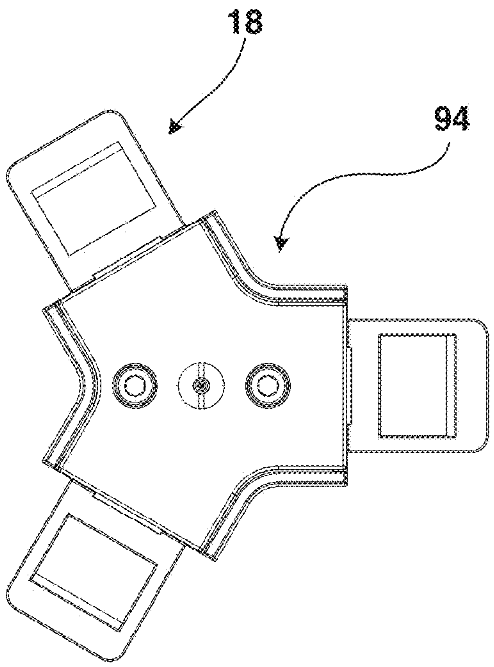
FIGS. 17*a* to 17*d* are top, side and perspective views of a first junction for a light fixture assembly.
Figure 17B:
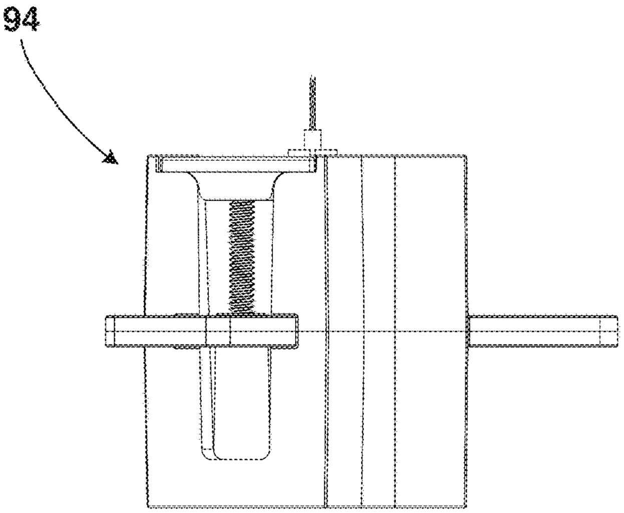
Figure 17C:
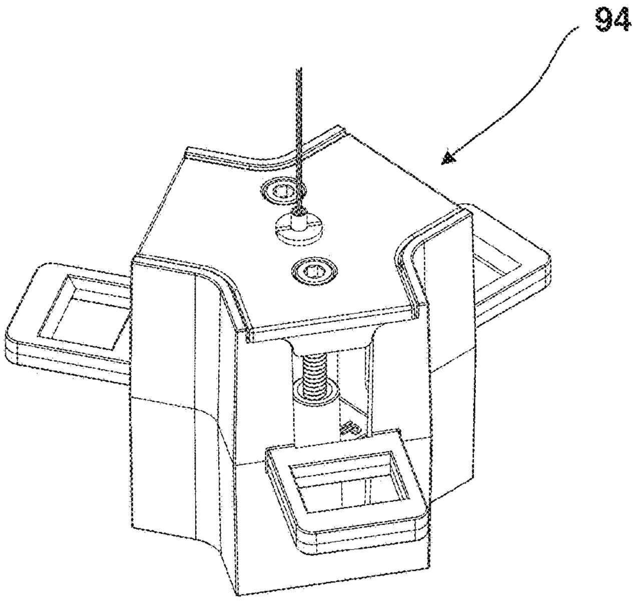
Figure 17D:
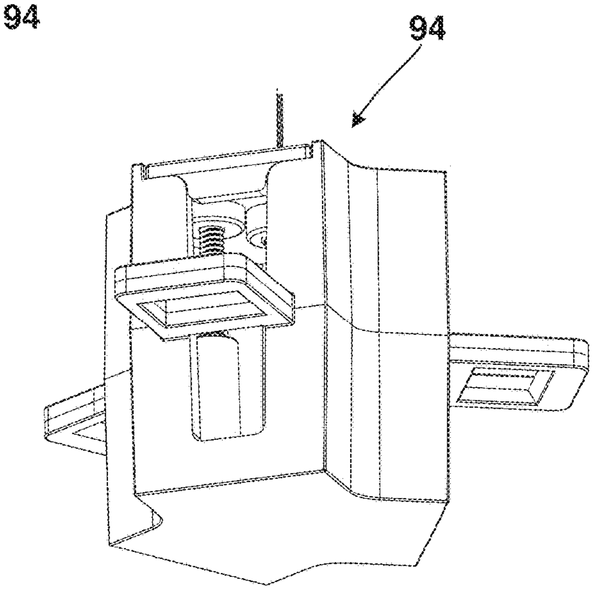
Figure 18A:
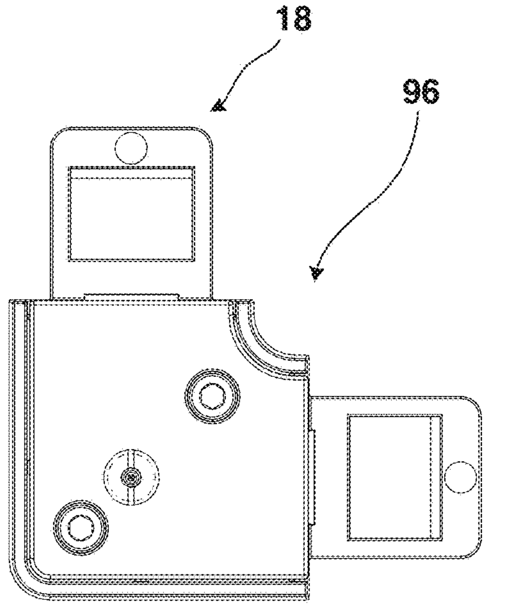
FIGS. 18*a* to 18*d* are top, side and perspective views of a first junction for a light fixture assembly.
Figure 18B:
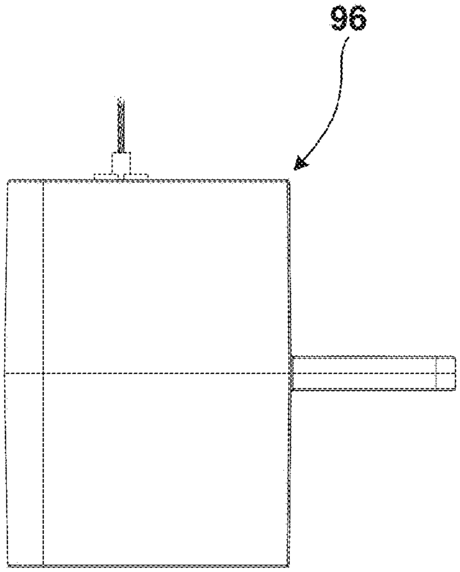
Figure 18C:
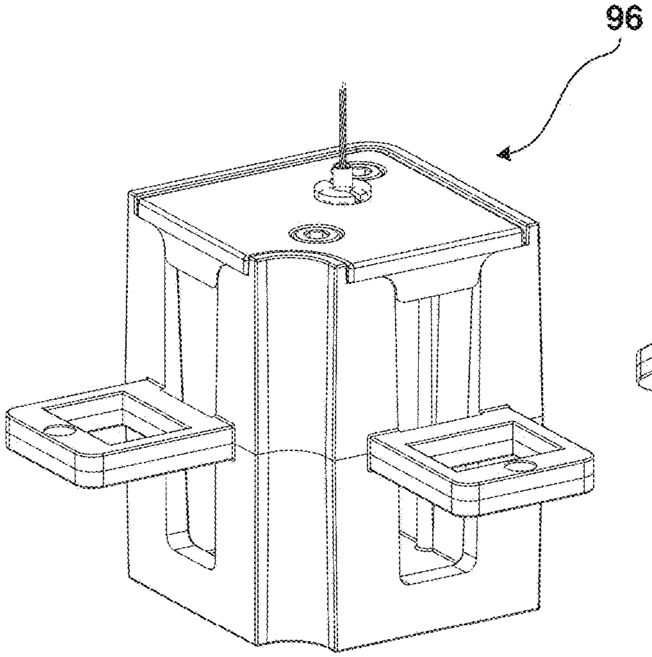
Figure 18D:
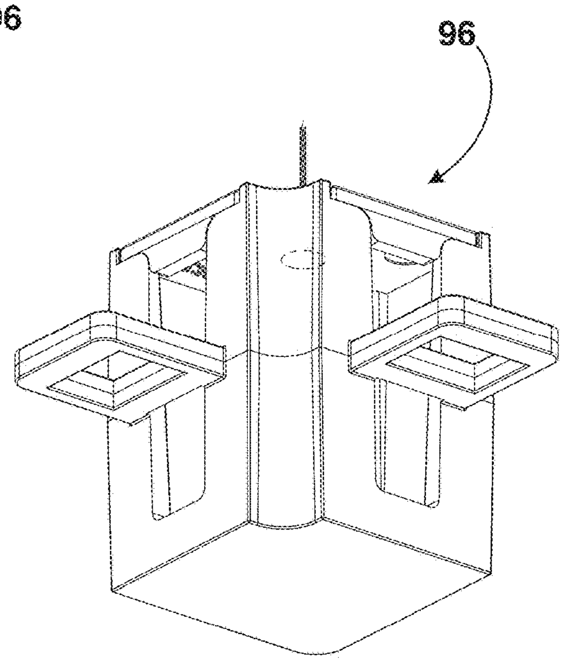

The coupler may also be used in different configurations, with different angles, and may be seen in FIGS. 11 and 12. In FIG. 11, the male portion 18 is at right angles to the female portion 22, while in FIG. 12, the male portion 18 is angularly adjustable relative to the female portion 22.

In some exemplary embodiments, the couplers may provide female and male portions, as shown above, or parts thereof as coupling units, which are nonetheless complementary for coupling as discussed herein to form the joint interface. The male and female portions (or parts thereof) may be provided on different couplers, or integrated in different groups of modular units for assembling a modular light fixture, such as direct-indirect light fixture. In the latter case, the light fixture may have light fixture segments with optics on one side only, but which may be assembled either in a direct configuration (with the optics facing toward a target lighting location) or in an indirect configuration (with the optics facing away from the target lighting location, in which case the light is reflected off neighboring walls and ceilings etc. back to the target lighting location). Thus, the light fixture segments may be assembled in many different combinations such as, in but one example, with them in alternating direct and indirect configurations, as discussed below with respect to FIGS. 20, 21 and 22.

In some exemplary embodiments, the light fixture segments may include housings to locate the optics or be the optics themselves, or be junctions for joining other light fixture segments. Exemplary embodiments of junctions are shown in FIGS. 13*a* to 18*d*, and include a linear junction 86 (FIGS. 13*a* to 13*d*), an angular junction 88 (FIGS. 14*a* to 14*d*) a T junction 90 (FIGS. 15*a* to 15*d*), an X junction 92 (FIGS. 16*a* to 16*d*), a Y junction 94 (FIGS. 17*a* to 17*d*), and an L junction 96 (FIGS. 18*a* to 18*d*), among other possible junctions. In these cases, the junctions include two or more coupling units, in these example as male portions as shown at 18, but may instead include one or more other forms of coupling units as describe therein, or different forms of coupling units on each junction, which extend outwardly from or are enabled in a junction body 98 having a first closed section 98*a*, a second opposite open section 98*b* and side walls 98*c* therebetween. A cover 98*d* is removably attached to the body to close the junction body, by way of fasteners shown at 98*e*. Located centrally in the cover is an anchor 98*f* to receive a cable end 98*g*, in order to suspend the junction body 98, and hence a modular light fixture assembly utilizing it, as a pendent light fixture. The first closed end section 98*a* is opposite the cover 98*d* to present, with corresponding exposed side walls 98*c* when installed, clean surfaces to the eye, which may be configured to complement the adjacent light fixture segments.

Figure 19:
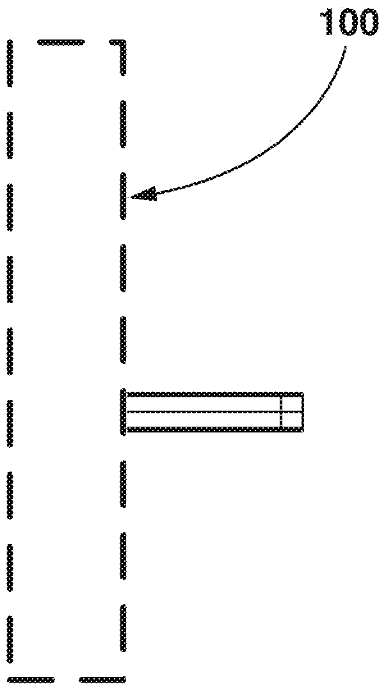
FIG. 19 is a schematic side view of another junction for a light fixture assembly.

In some exemplary embodiments, the light fixture segment may be an anchor segment, such as shown schematically at 100 in FIG. 19, with a coupling unit, in this example as a male portion, but may alternatively include other forms of coupling units as described herein, and which may be configured to anchor the assembled modular light fixture directly or indirectly to a wall or ceiling or some other installation location. In this case, one or more of the coupling units may thus be integrated into with the anchor segment.

FIGS. 23*a* to 23*d*, FIGS. 24*a* to 24*d*, FIGS. 25*a* to 25*e* and FIGS. 26*a* to 26*f* show top perspective, bottom perspective, side or plan views of a number of exemplary embodiments showing light fixture segments 106 to 112, in different configurations and may show elements of one or more ornamental designs or variants thereof for such light fixture segments, as well as stippled and/or solid lines showing one or more indefinite dimensions such as depth (or thickness) or width of the designs or variants shown. Further, for those views not shown, they are considered to be identical (though in some cases they may be reversed) to the corresponding views shown. Further, these figures may show elements in stippled lines that may not form part of the designs or variants thereof. Further, elements of such designs or variants thereof may also include such stippled lines in solid lines in some exemplary embodiments, or include features or elements from other exemplary embodiments described or shown herein, and which may include one or more of the junctions such as those illustrated above at 86, 88, 90, 92, 94 and 96, in some exemplary embodiments, and/or light fixture housings or other segments, portions as described herein, or the like.

In some exemplary embodiments, the couplers may be provided in a kit for joining together at least a pair of light fixture segments, such as the housing sections 10 and 12 as examples, or other light fixture segments, at a joint interface between them to form a light fixture assembly. The kit may comprise at least a pair of complementary coupling units, each configured to be located in an operative position in one of the light fixture segments to join the other coupling unit at the joint interface defined by complementary abutment surfaces on the light fixture segments. At least one of the coupling units may thus be configured to be adjustably located in the operative position to displace the other of the coupling units along a designated travel path toward a limit position, so that joining of the light fixture segments at the joint interface may occur in advance of the other coupling unit reaches the limit position.

If desired, the limit position may be associated with a designated landmark, such as a visible landmark, on one of the coupler units, such as periphery 36.

In some exemplary embodiments, at least one coupling unit may be a drive coupling unit and the other coupling unit may be a follower coupling unit, wherein the drive coupling unit includes the landmark, and the operative position for the drive coupling unit may be selectable along a position path with the landmark visually misaligned relative to the corresponding abutment surface.

In some exemplary embodiments, the drive coupling may thus include at least one female portion or a part thereof and the follower coupling may include at least one male portion or a part thereof. Alternatively, the male and female portions or their respective parts thereof, may be deployed respectively on the drive and follower coupling units.

In some exemplary embodiments, the drive coupling unit may include an actuator element, which is responsive to an actuation force to engage and displace the follower coupling unit, wherein the actuator element may include a threaded fastener, clamp, lever or other actuation force delivery analogue thereof.

In some exemplary embodiments, the kit may include one or more of the light fixture segments, which may be selected from one or more of a first group of segments with one or more light sources, and a second group of segments without one or more light sources. The second group may include segments configured to join together segments of the first group to one another or directly or indirectly to a wall or ceiling, for example. The second group may include at least two coupling units, each for joining another one of the other coupling units at one of a corresponding at least two respective joint interfaces.

Thus, at least a pair of light fixture segments may be assembled together at a joint interface to form a light fixture assembly, by first providing at least a pair of complementary coupling units. Next, at least one of the coupling units may be located in an operative position in one of the light fixture segments, with at least one other of the coupling units positioned in the other of the coupling units. At least one of the coupling units may then be actuated to draw the at least one other coupling unit along a designated travel path toward a limit position to form the joint interface.

Figure 20:
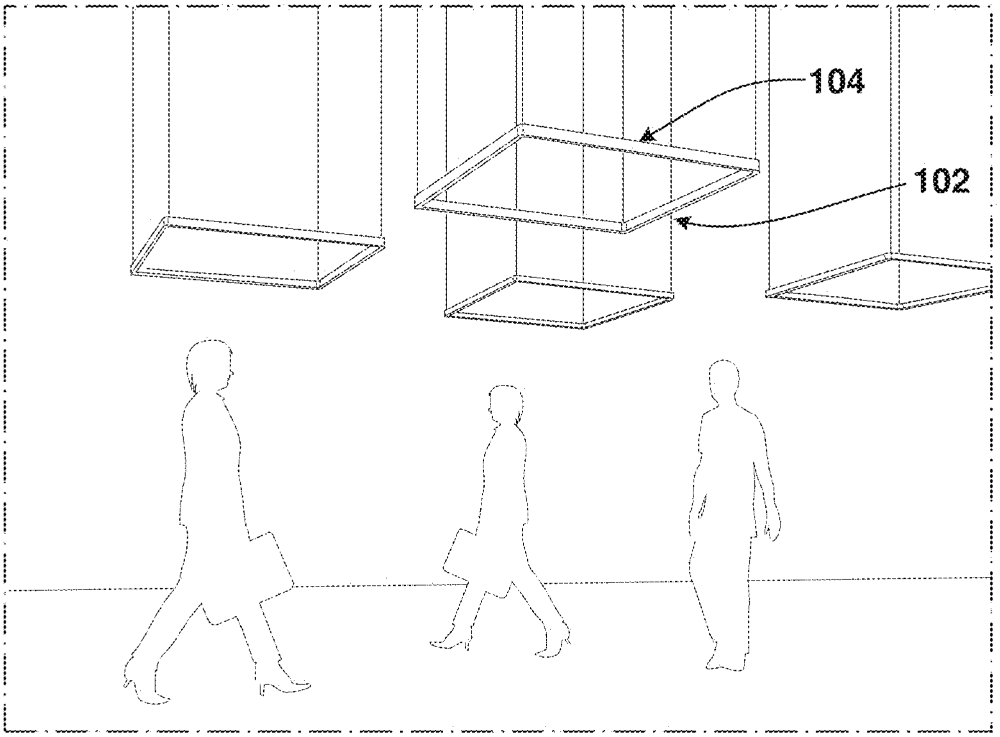
FIGS. 20 to 22 are perspective views of light fixture installations.
Figure 21:
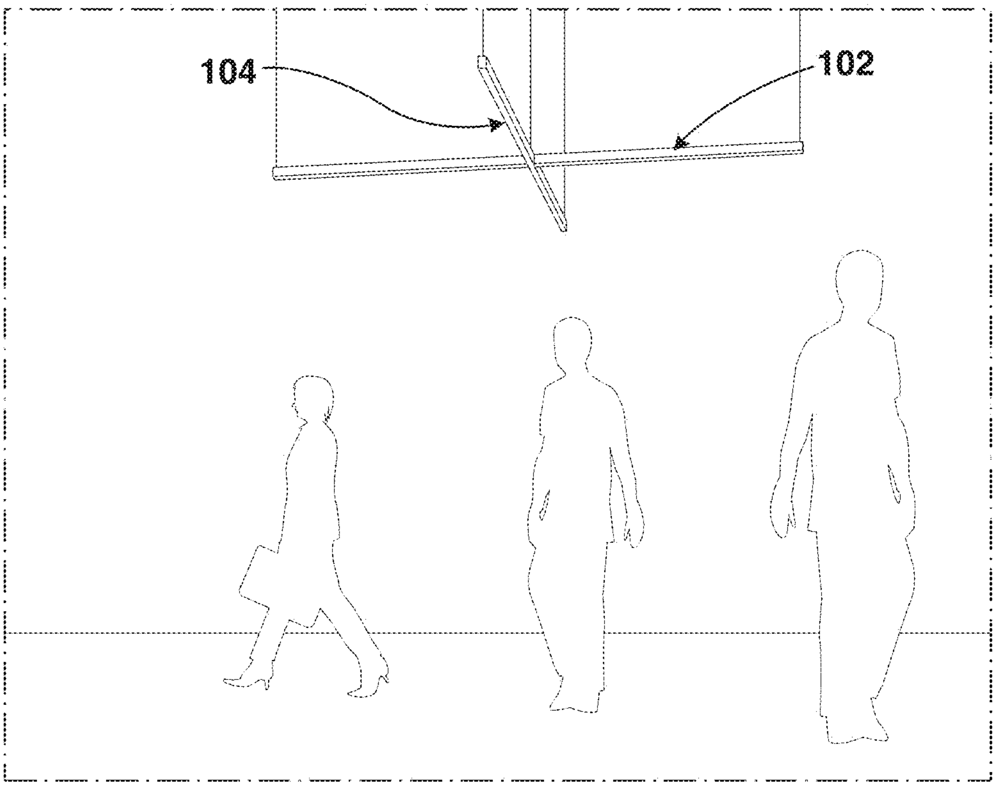
Figure 22:
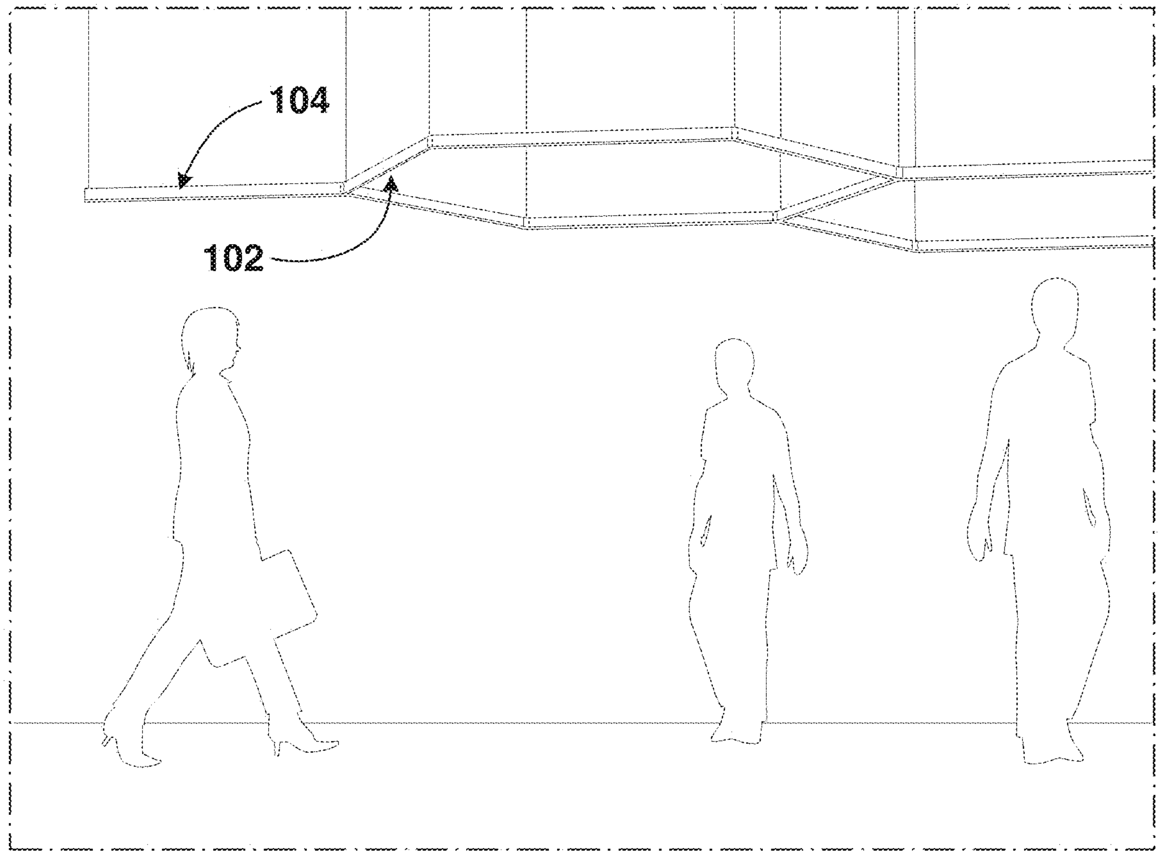
Figure 23A:
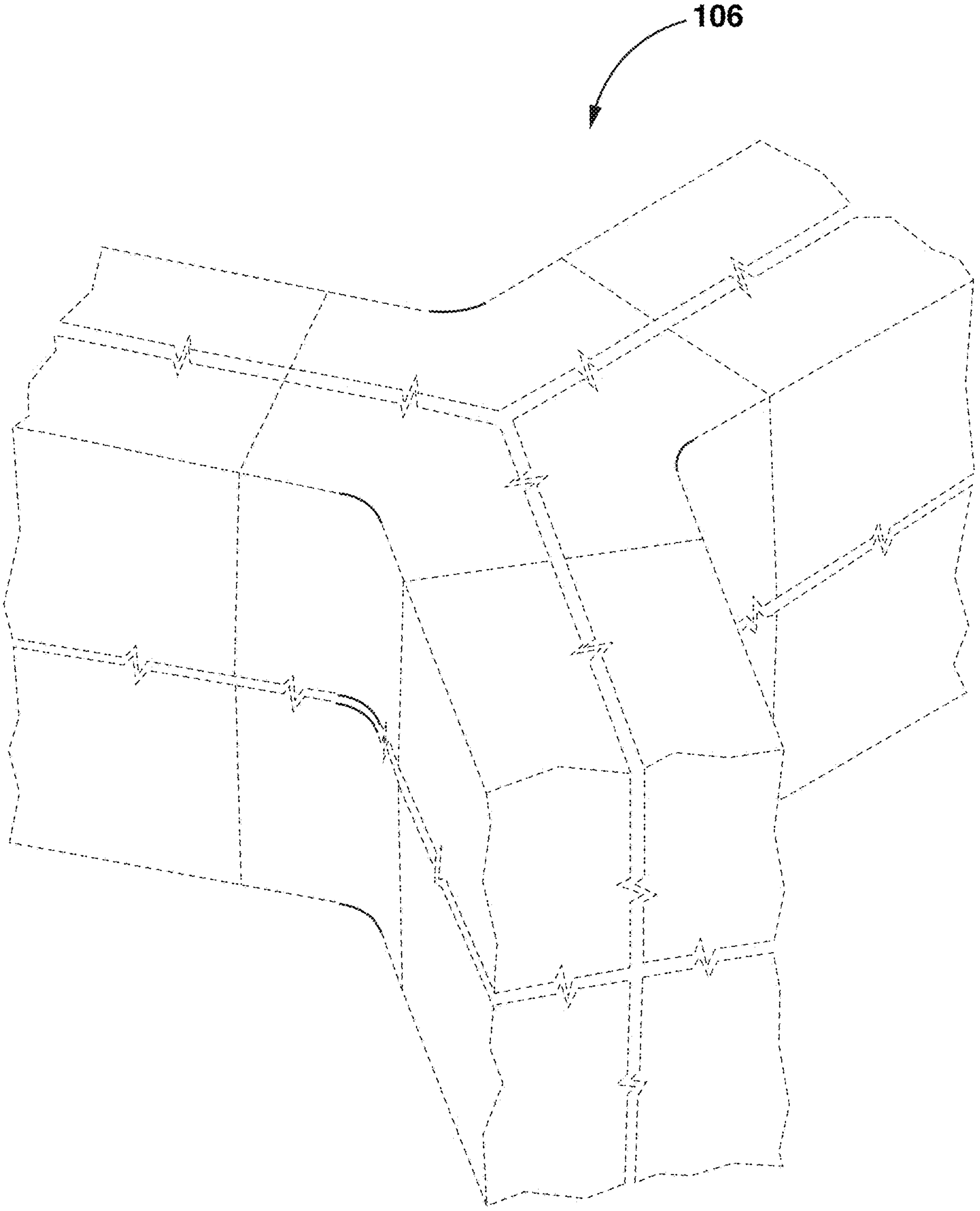
FIGS. 23*a* to 23*d* are top perspective, bottom perspective, side and plan views of a light fixture segment.
Figure 23B:
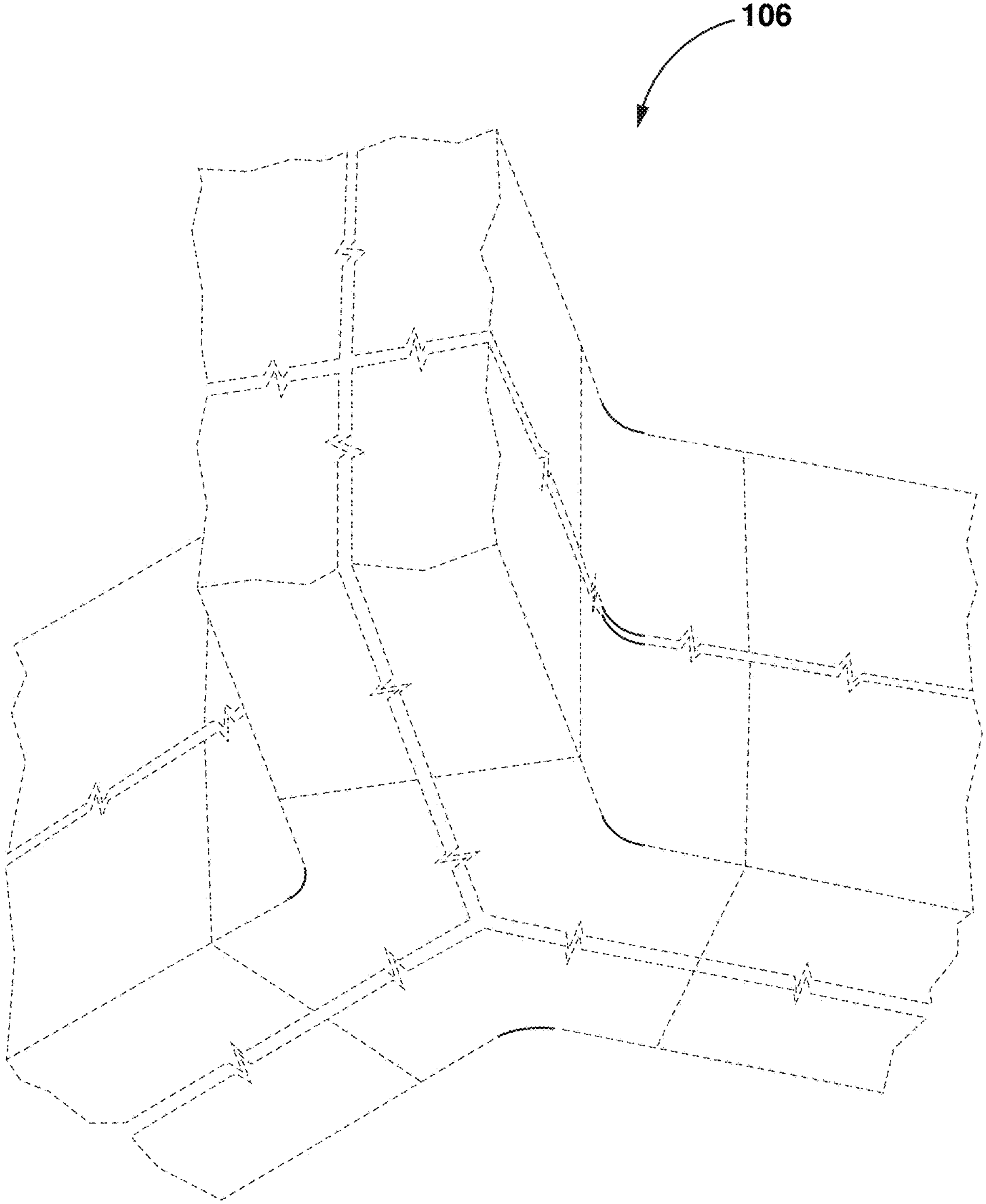
Figure 23C:
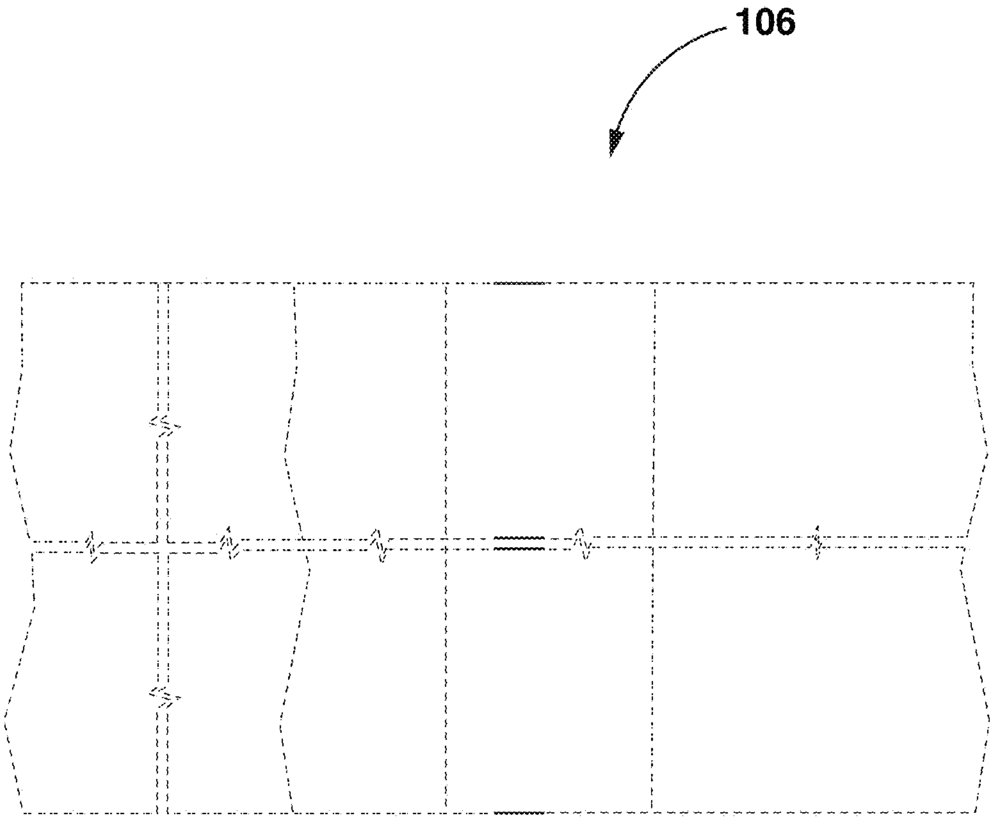
Figure 23D:
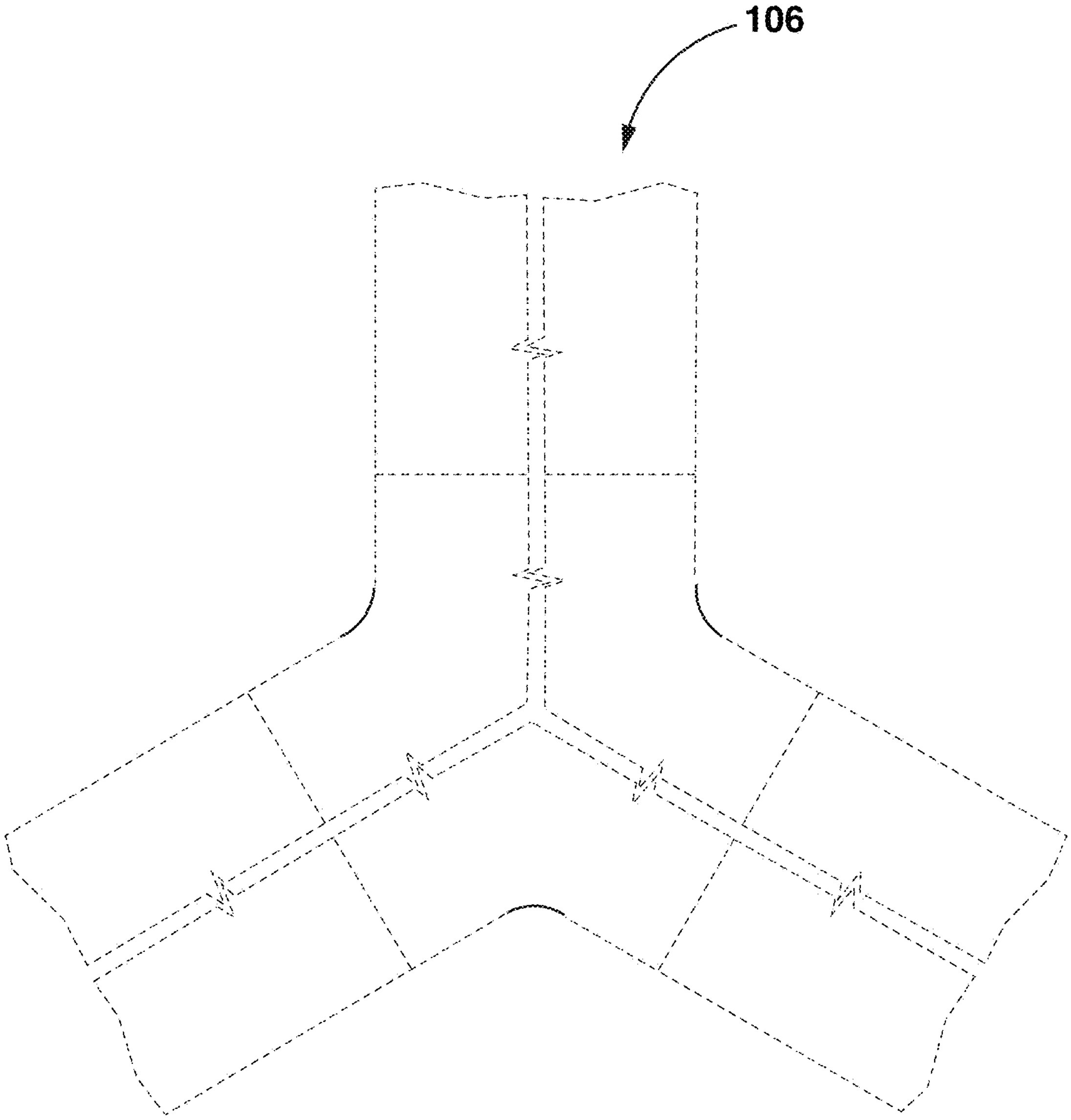
Figure 24A:
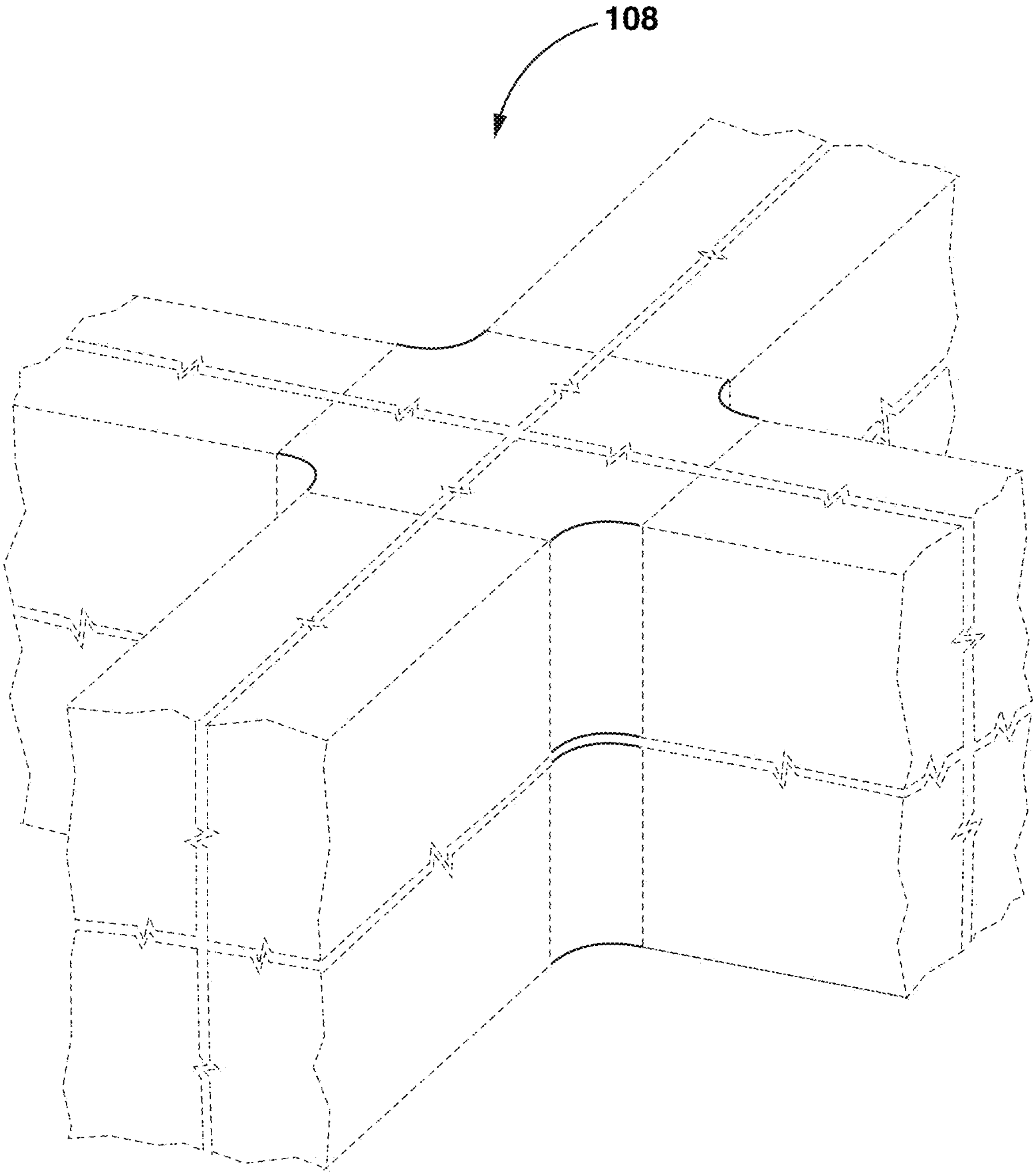
FIGS. 24*a* to 24*d* are top perspective, bottom perspective, side, and plan views of another light fixture segment.
Figure 24B:
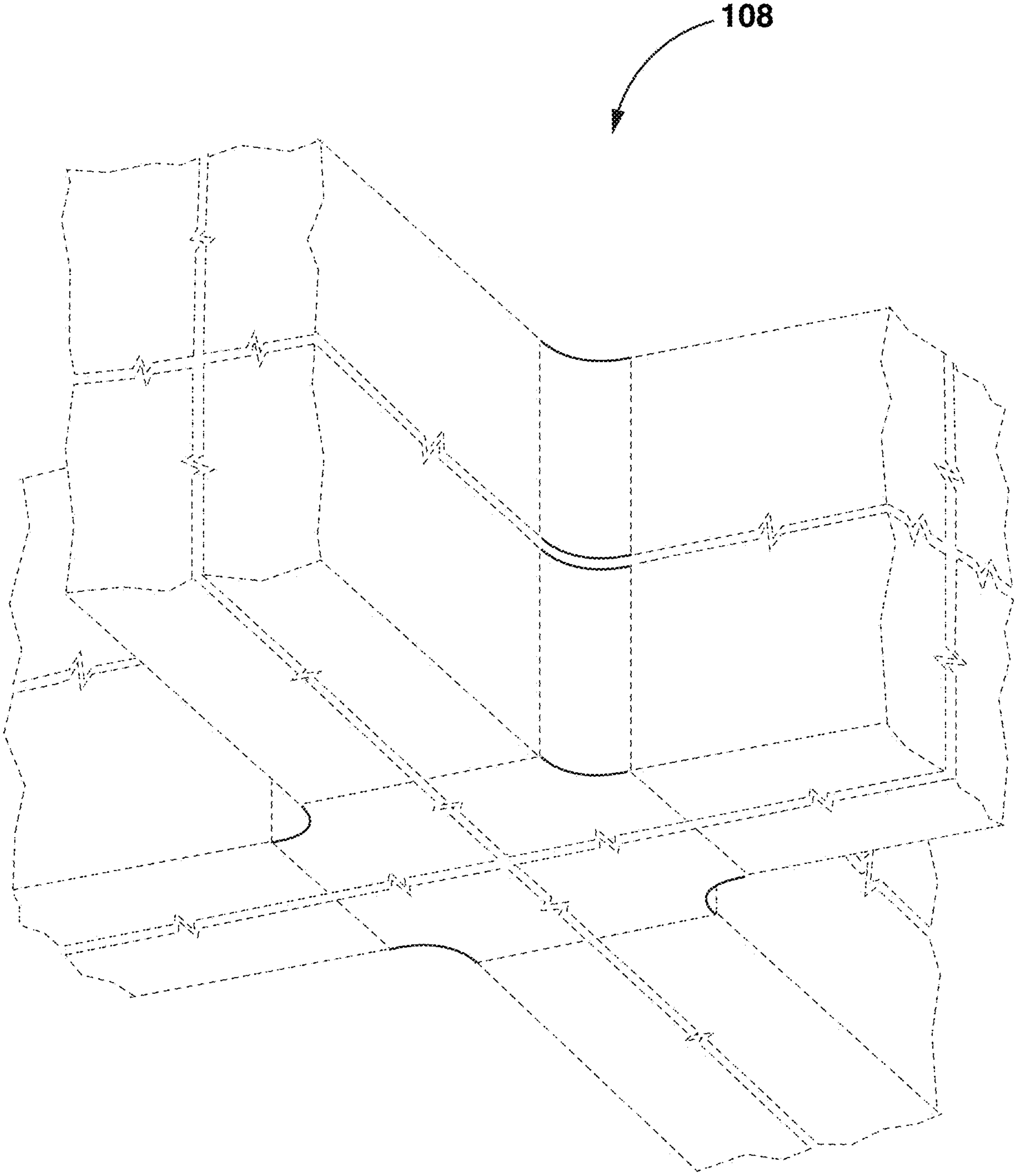
Figure 24C:
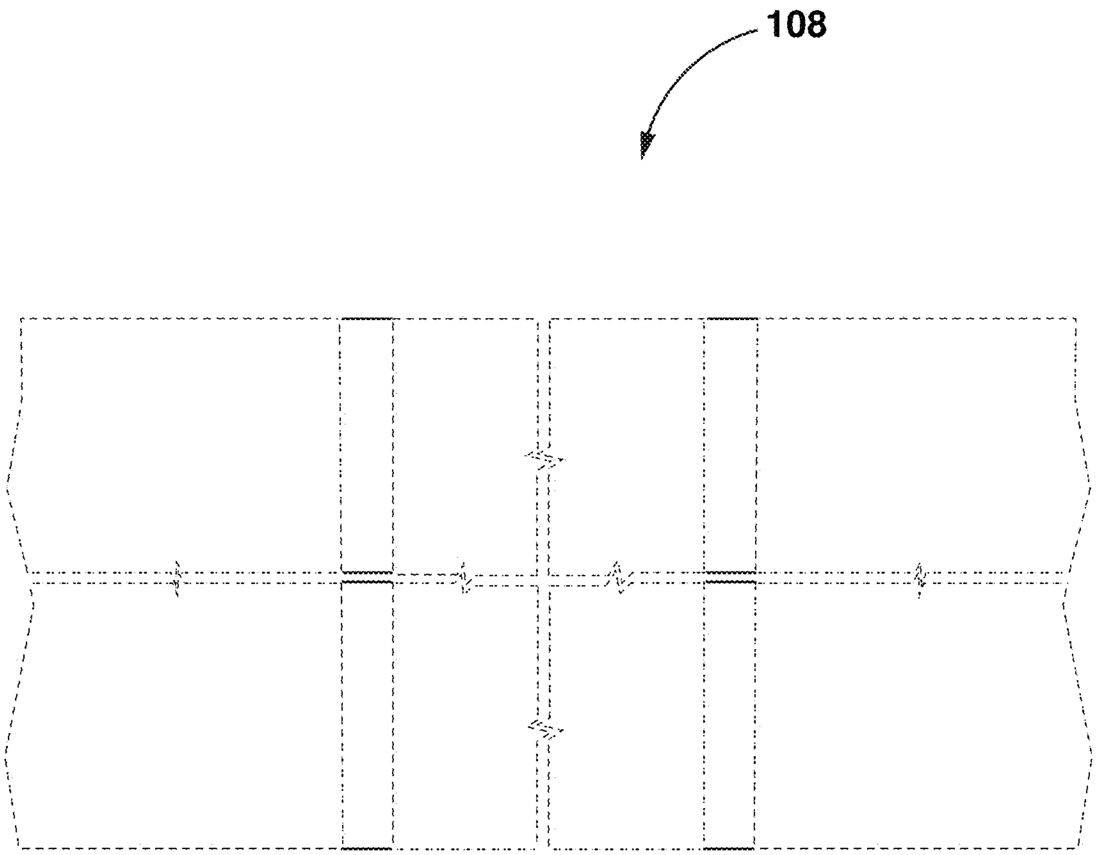
Figure 24D:
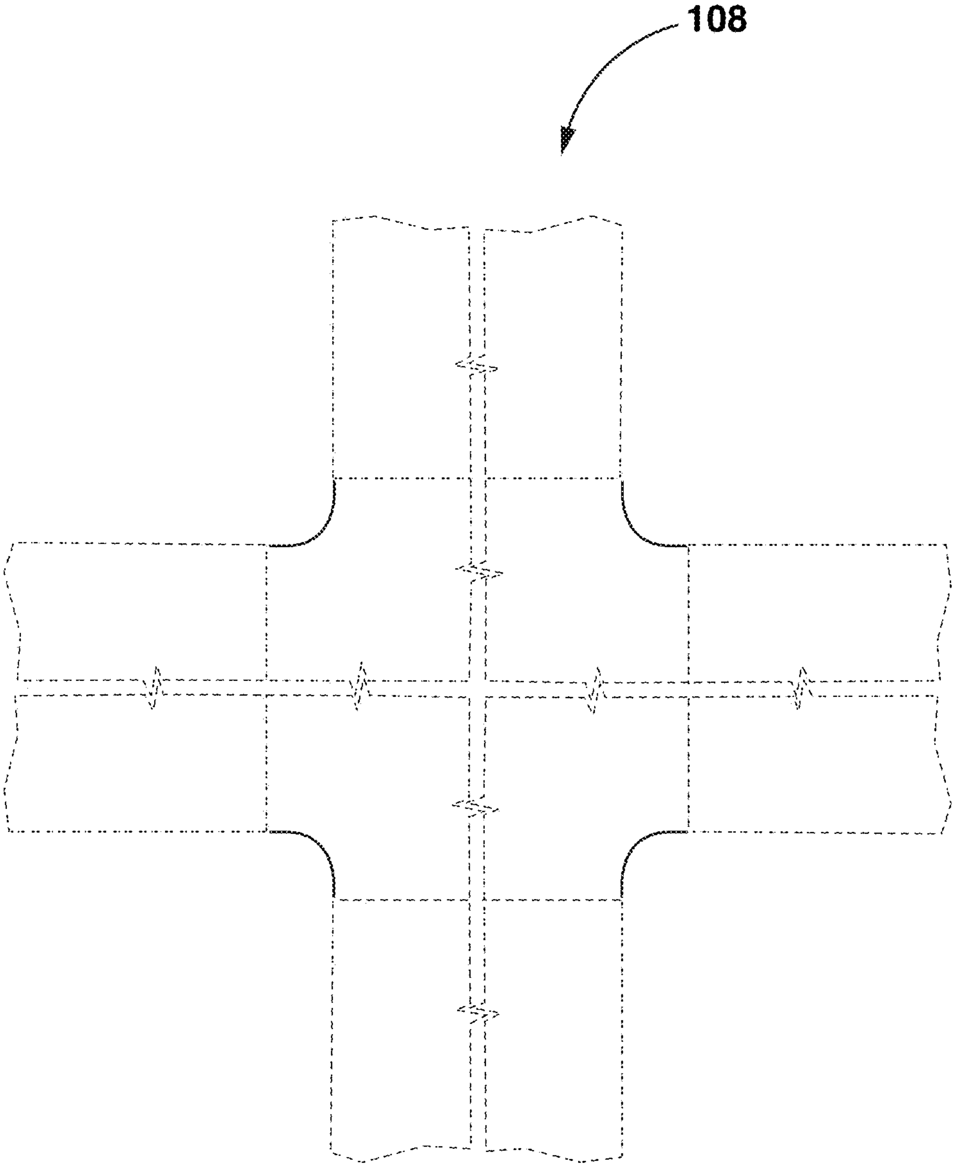
Figure 25A:
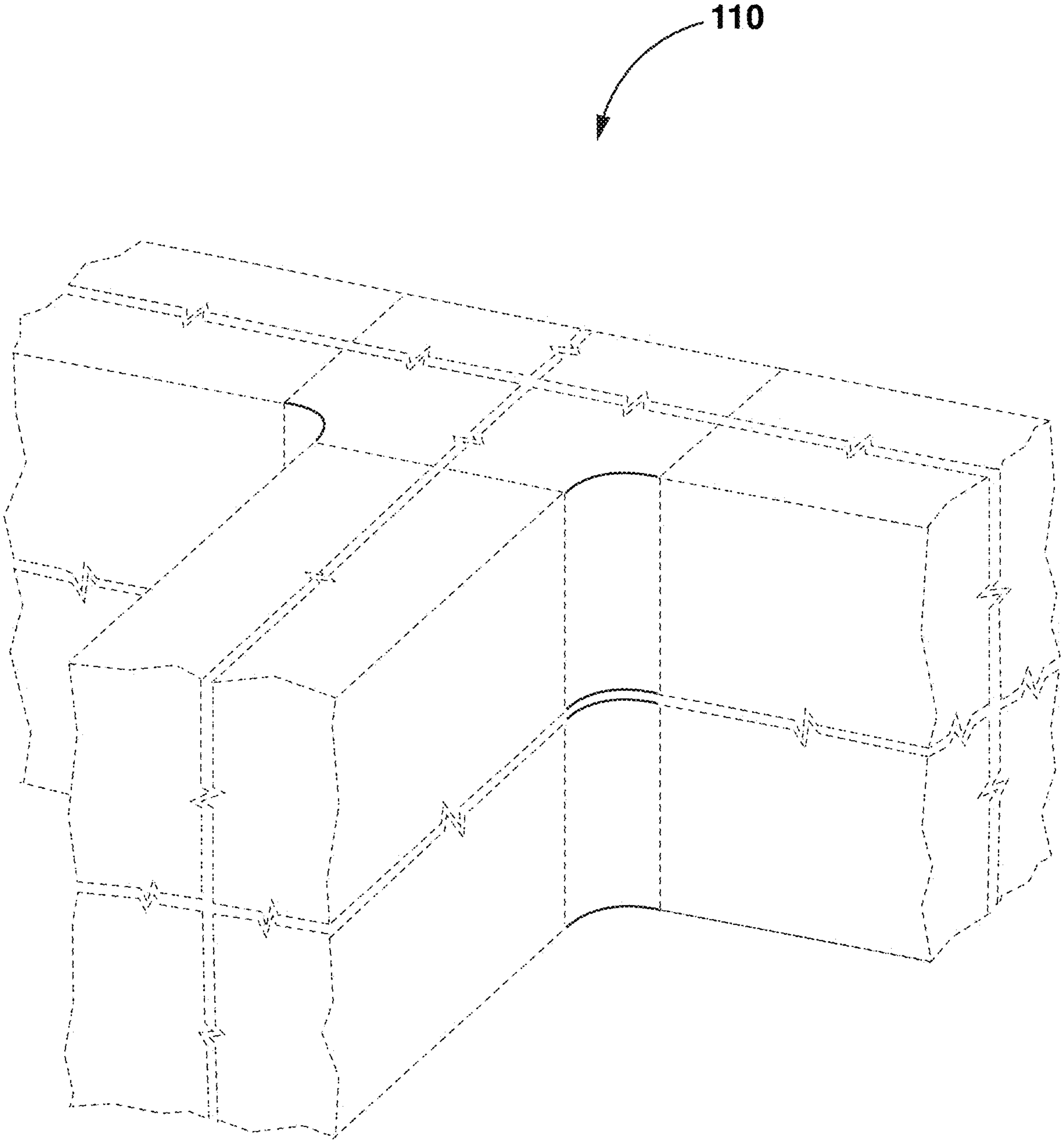
FIGS. 25*a* to 25*e* are top perspective, bottom perspective, side, side and plan views of another light fixture segment.
Figure 25B:
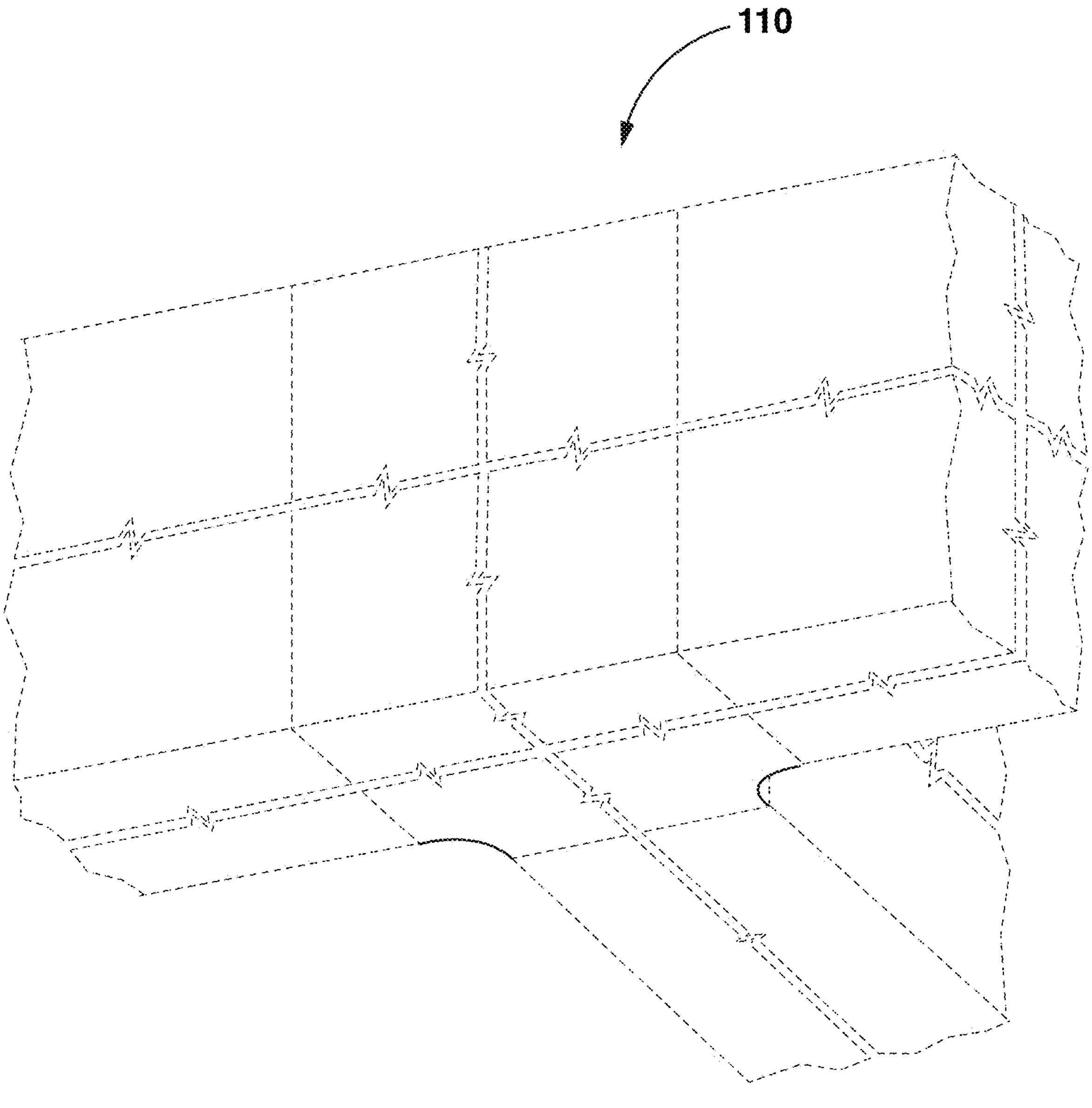
Figure 25C:
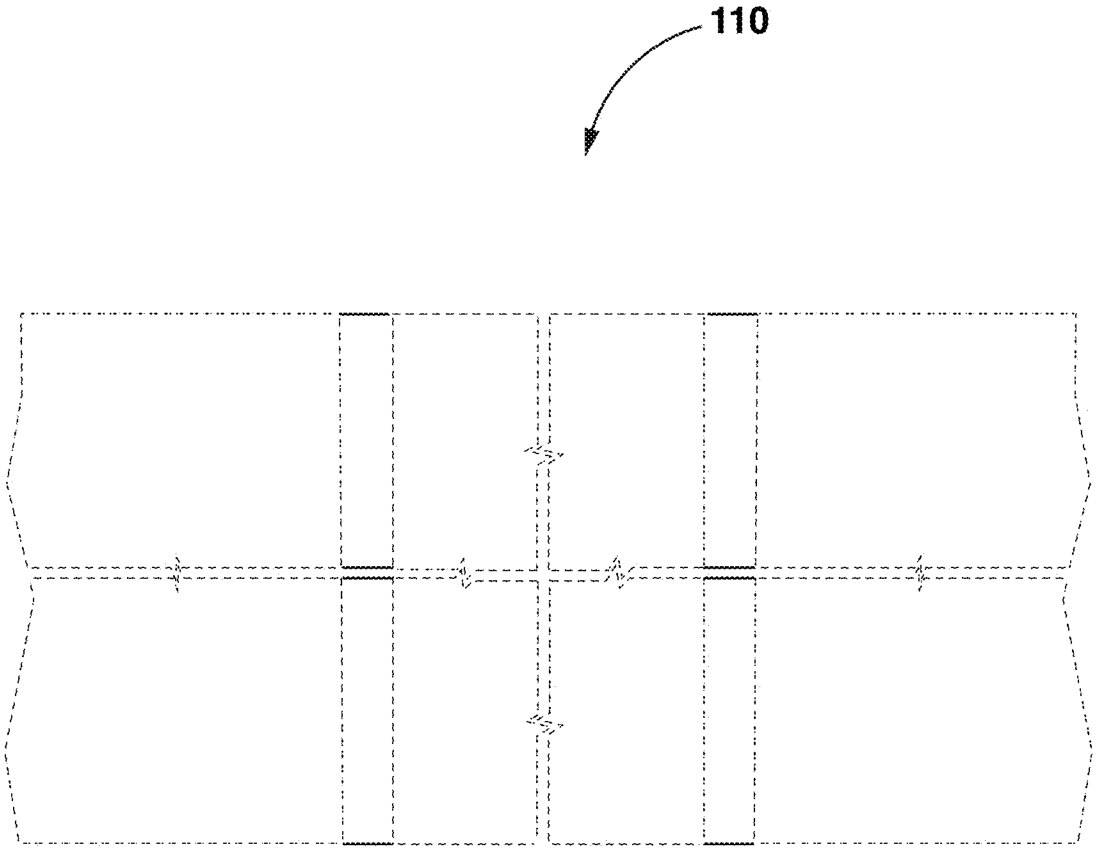
Figure 25D:
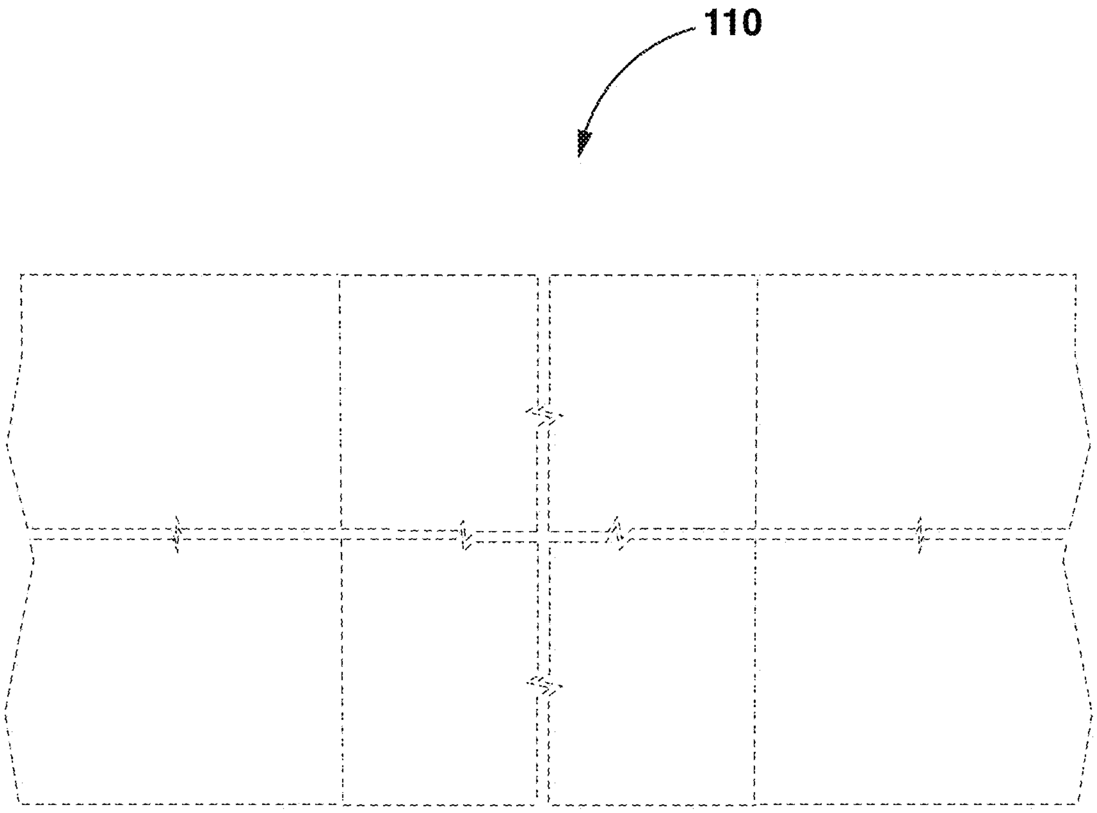
Figure 25E:
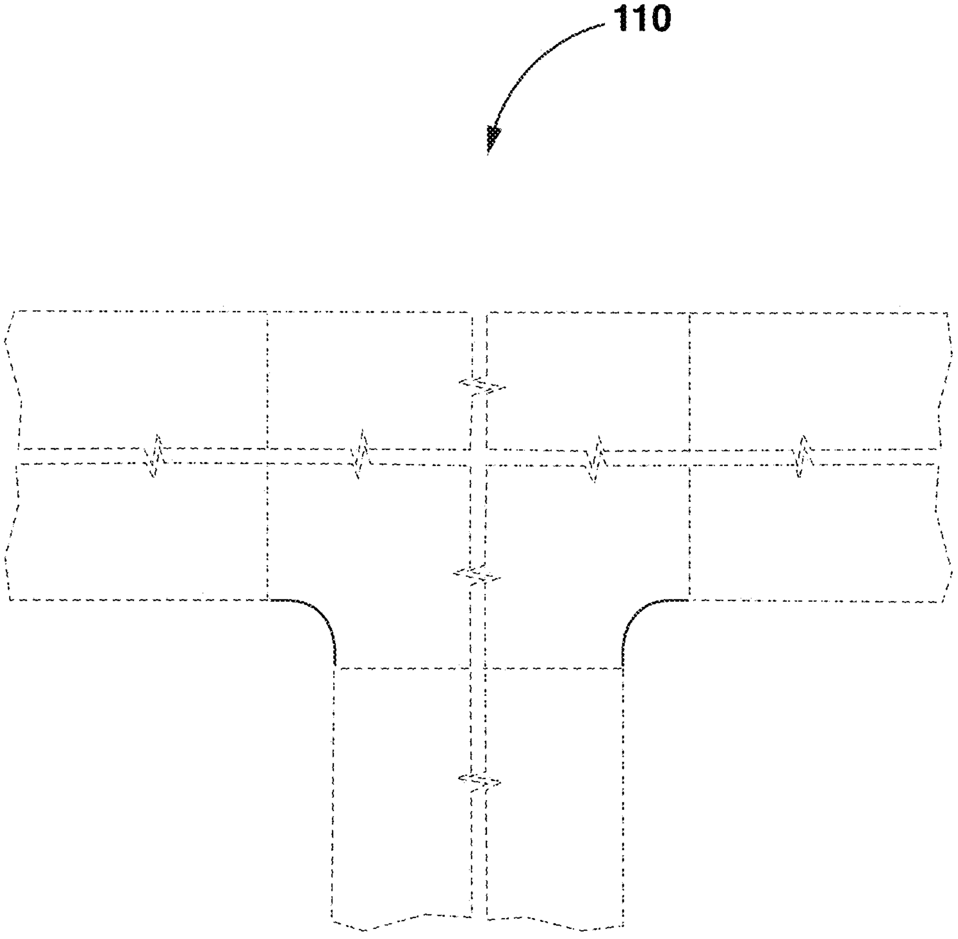
Figure 26A:
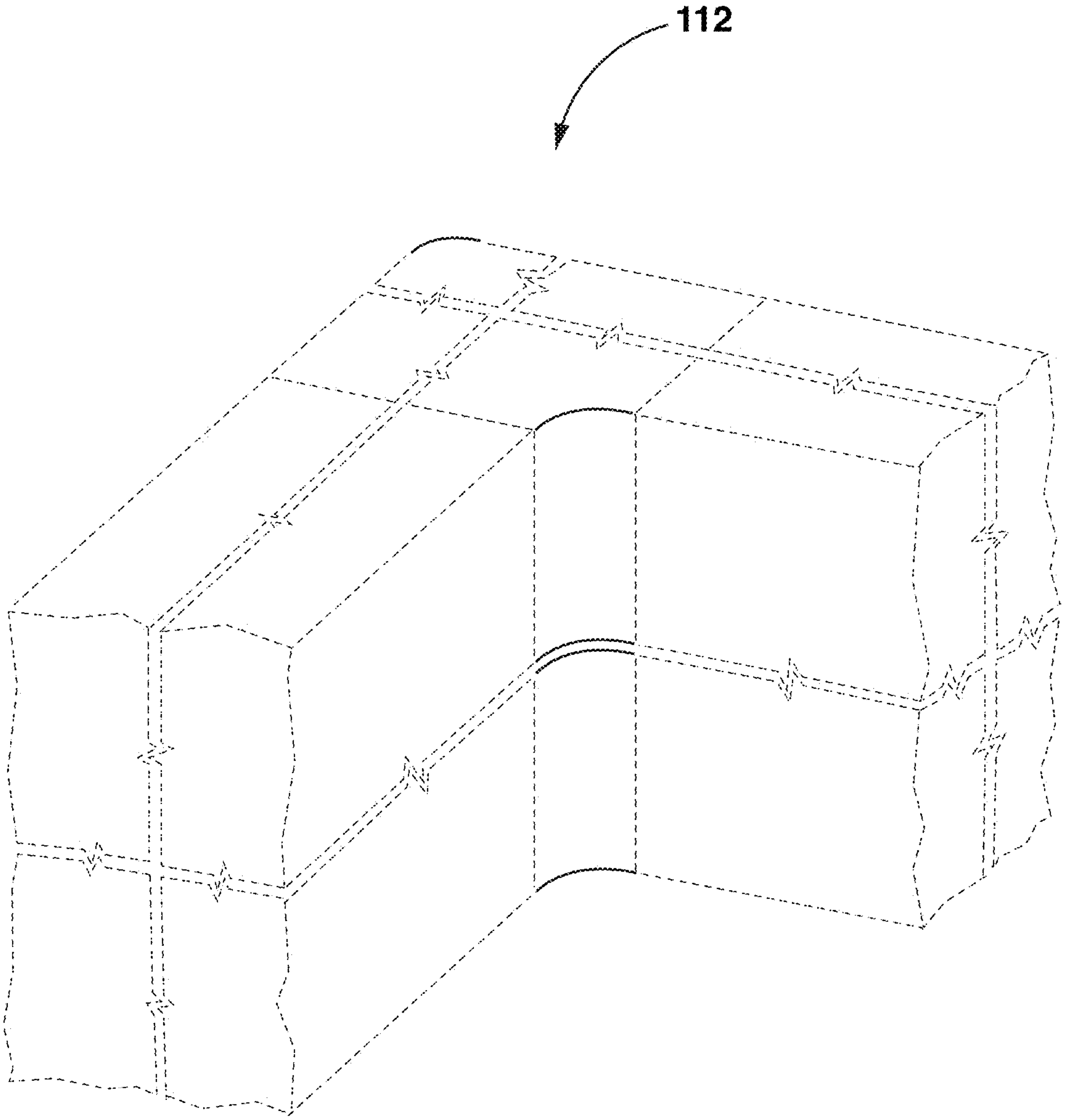
FIGS. 26*a* to 26*e* are top perspective, bottom perspective, side, side and plan views of another light fixture segment.
Figure 26B:
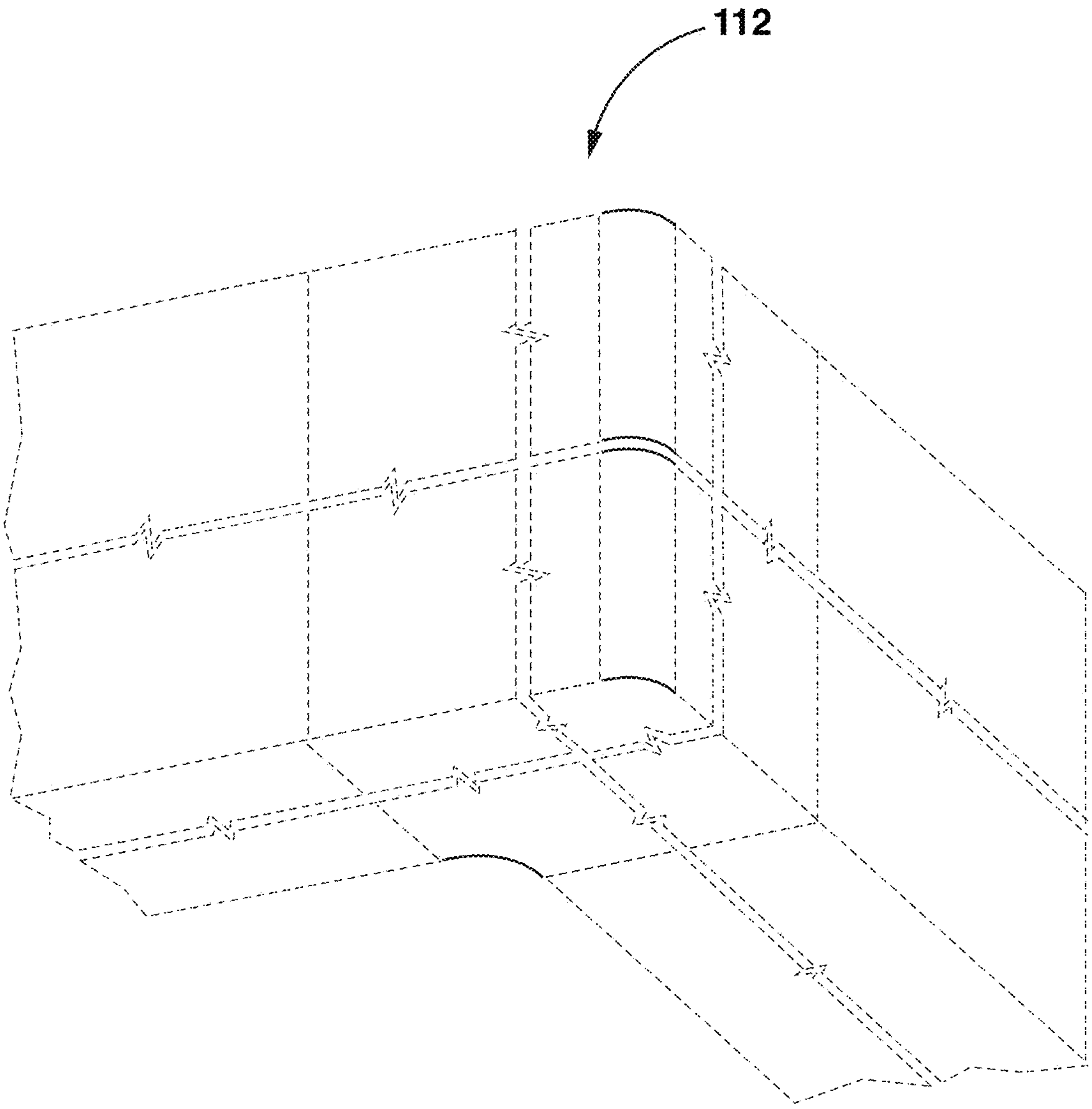
Figure 26C:
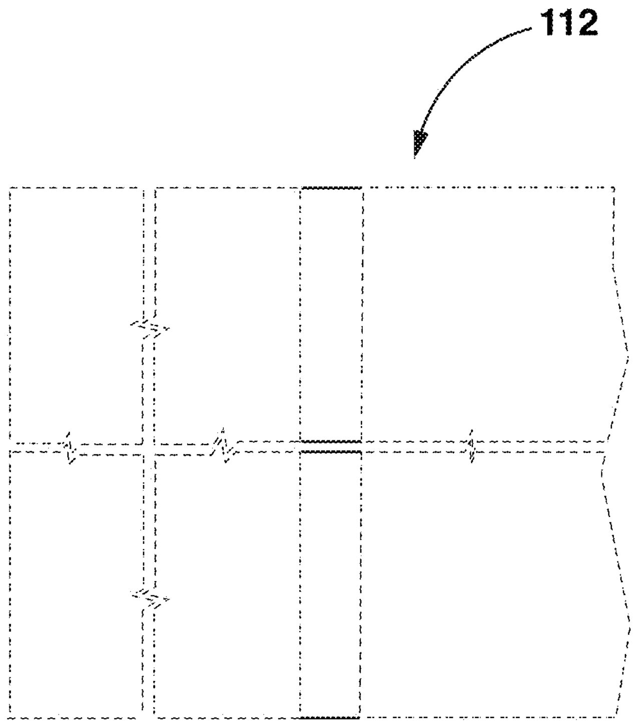
Figure 26D:
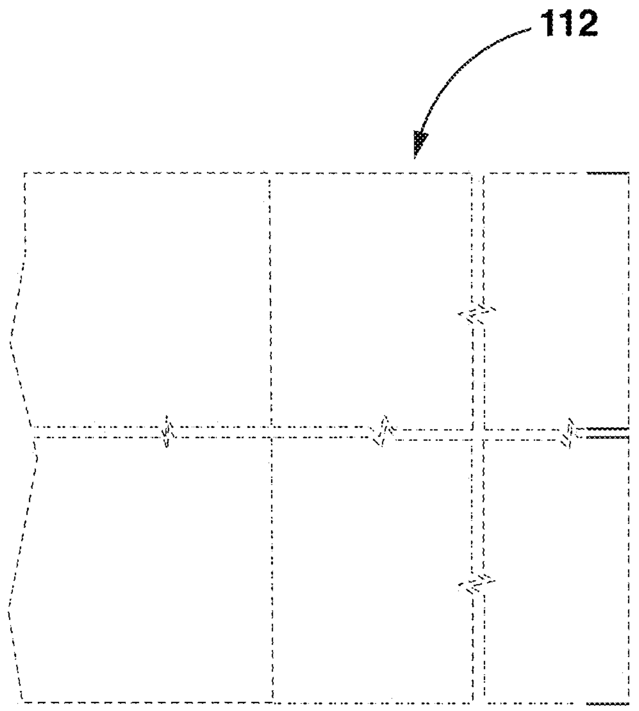
Figure 26E:
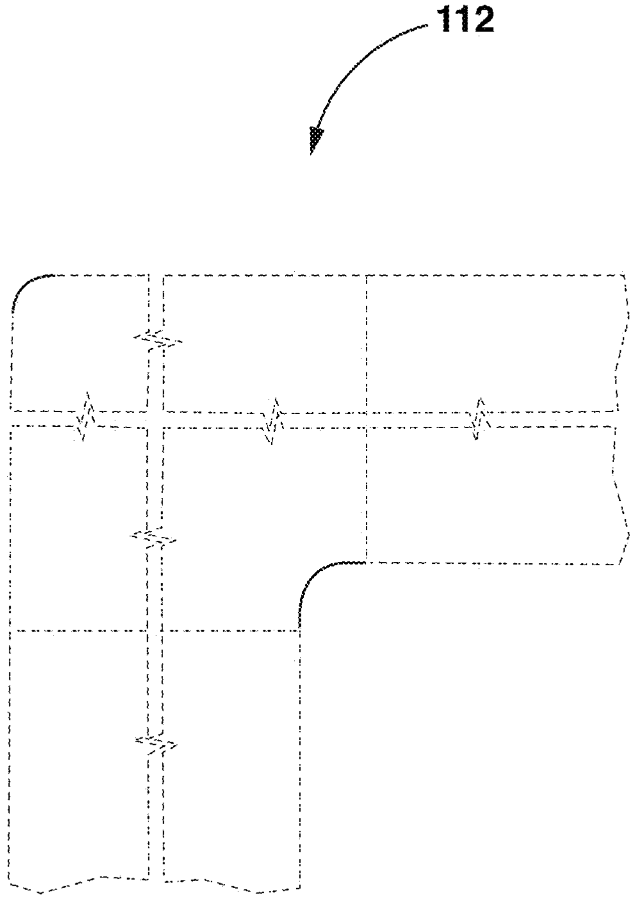

Exemplified light fixture installations are shown in FIGS. 19 to 21, where adjacent light fixture segments are joined in different configurations housing segments, making use of different junctions and alternating direct and indirect configurations identified for example at 102, 104 respectively.

Thus, in some exemplary embodiments, a coupler unit may be provided for coupling together adjacent sections of a pair of articles at a coupling interface therebetween to form a coupled assembly, for mounting relative to a wall or ceiling, and configured to be used in units of two to form the coupling interface therebetween. In this case, the coupler unit may comprise at least first one end with a coupling projection formed therein. The coupler unit may be operable in a first mode to enable the coupling projection, and at least opposite one second end with a coupling receiver formed therein. The coupler unit may be operable in a second mode to enable the coupling receiver to receive an instance of the enabled projection on an adjacent coupler unit in the first mode. Thus, each coupler may be configured to be installed in a corresponding one of the articles, with the enabled coupling projection received by the enabled coupling receiver and latched in position therewith to form the coupling interface.

While exemplary embodiments of a coupler are disclosed herein with reference to light fixtures and/or light fixture housings, such couplings may be used in other coupling interfaces, such as other ceiling or wall mounted decorative units or the like.

While exemplary embodiments of a coupler have single male or female portions which are interoperable, further exemplary embodiments may include a plurality of one or more of the male and female portions or portions thereof.

Referring to the FIGS. 27 to 31, some exemplary embodiments may provide a junction device shown at 120 for joining adjacent housing sections of a light fixture housing assembly, such as those shown above at 10 or 12 in FIG. 1.

Figure 28:
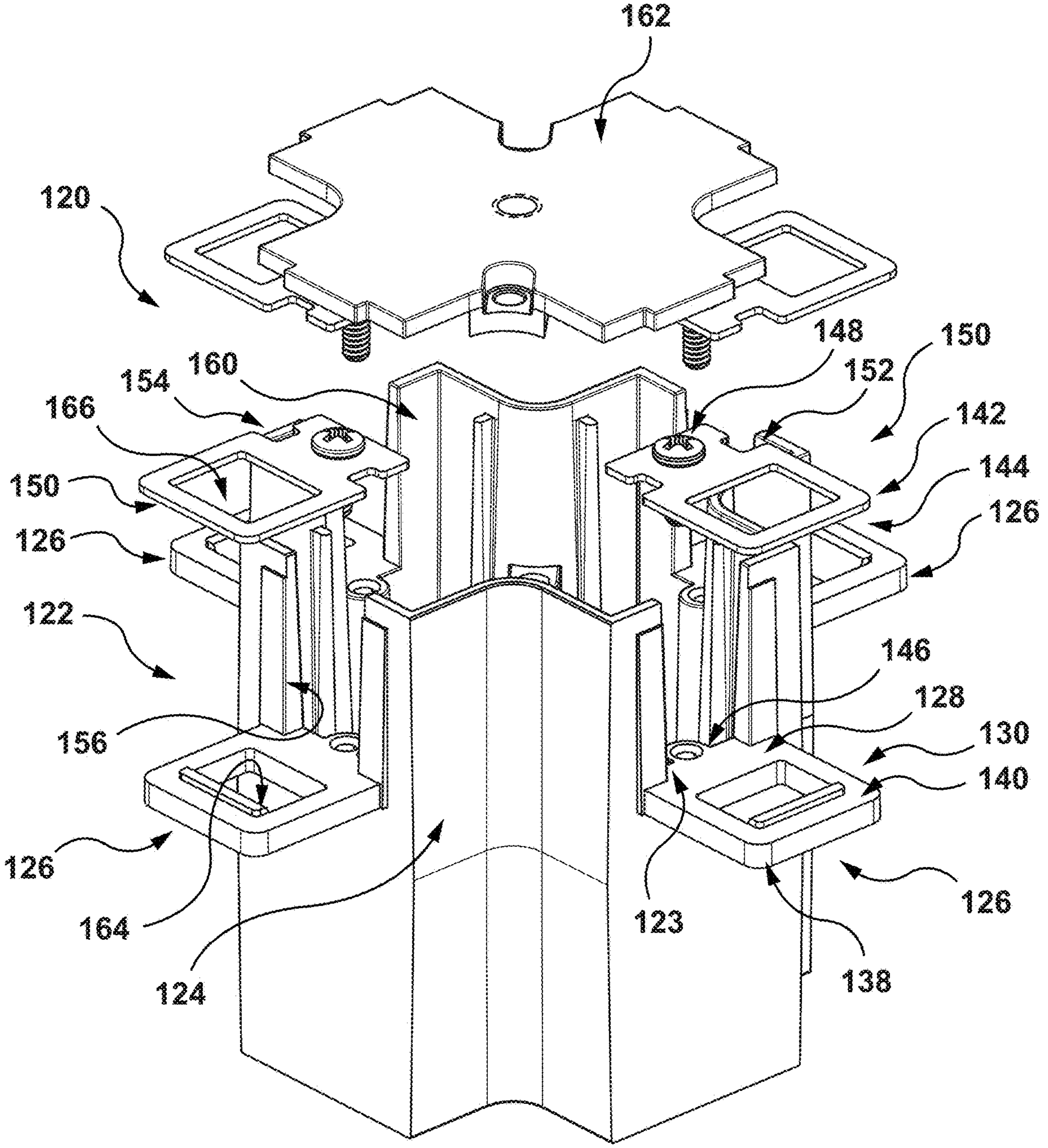
FIG. 28 is an exploded top perspective assembly of the device of FIG. 27.
Figure 29:
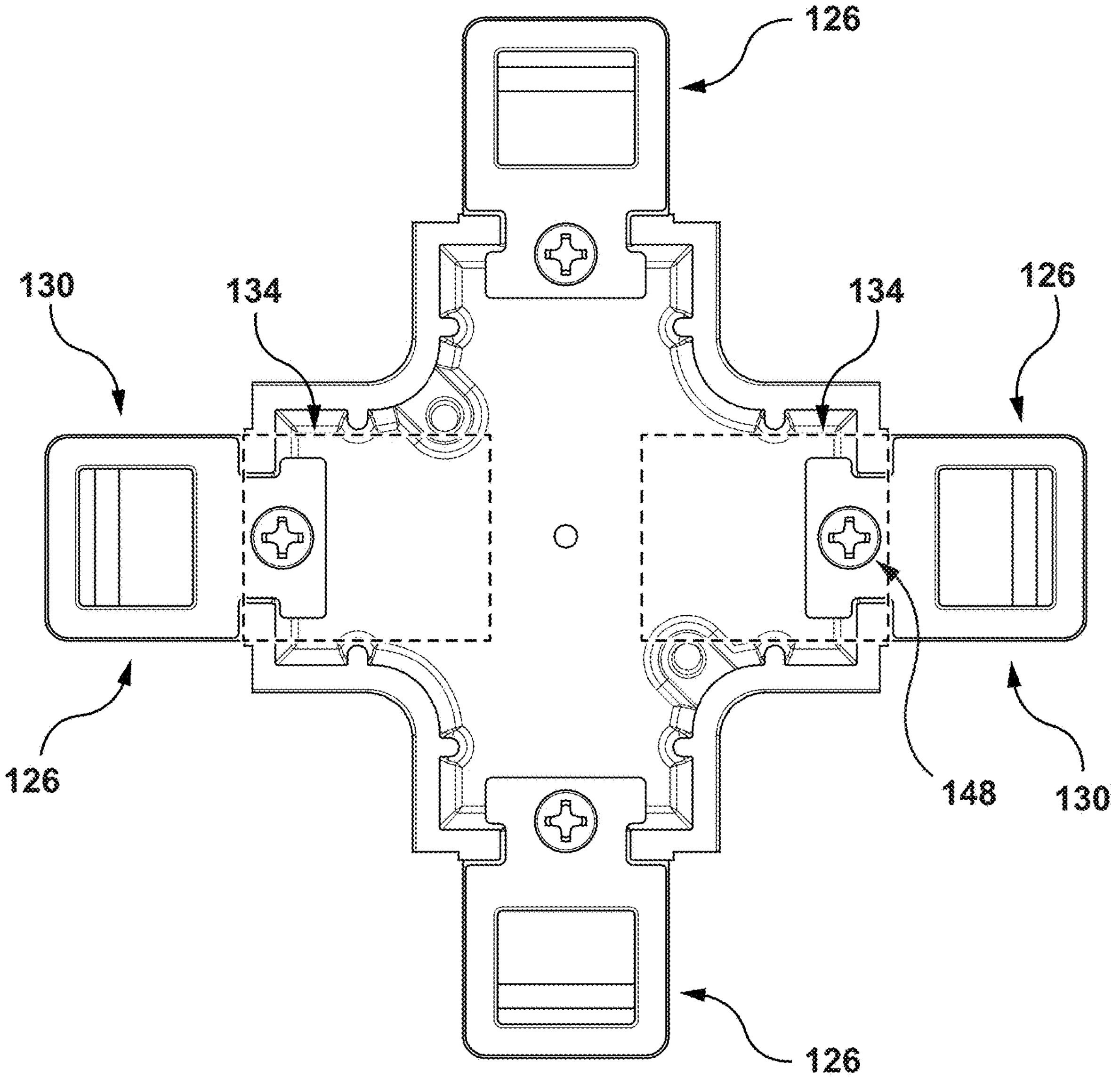
FIG. 29 is a part-schematic plan view of the device of FIGS. 27 and 28.
Figure 30:
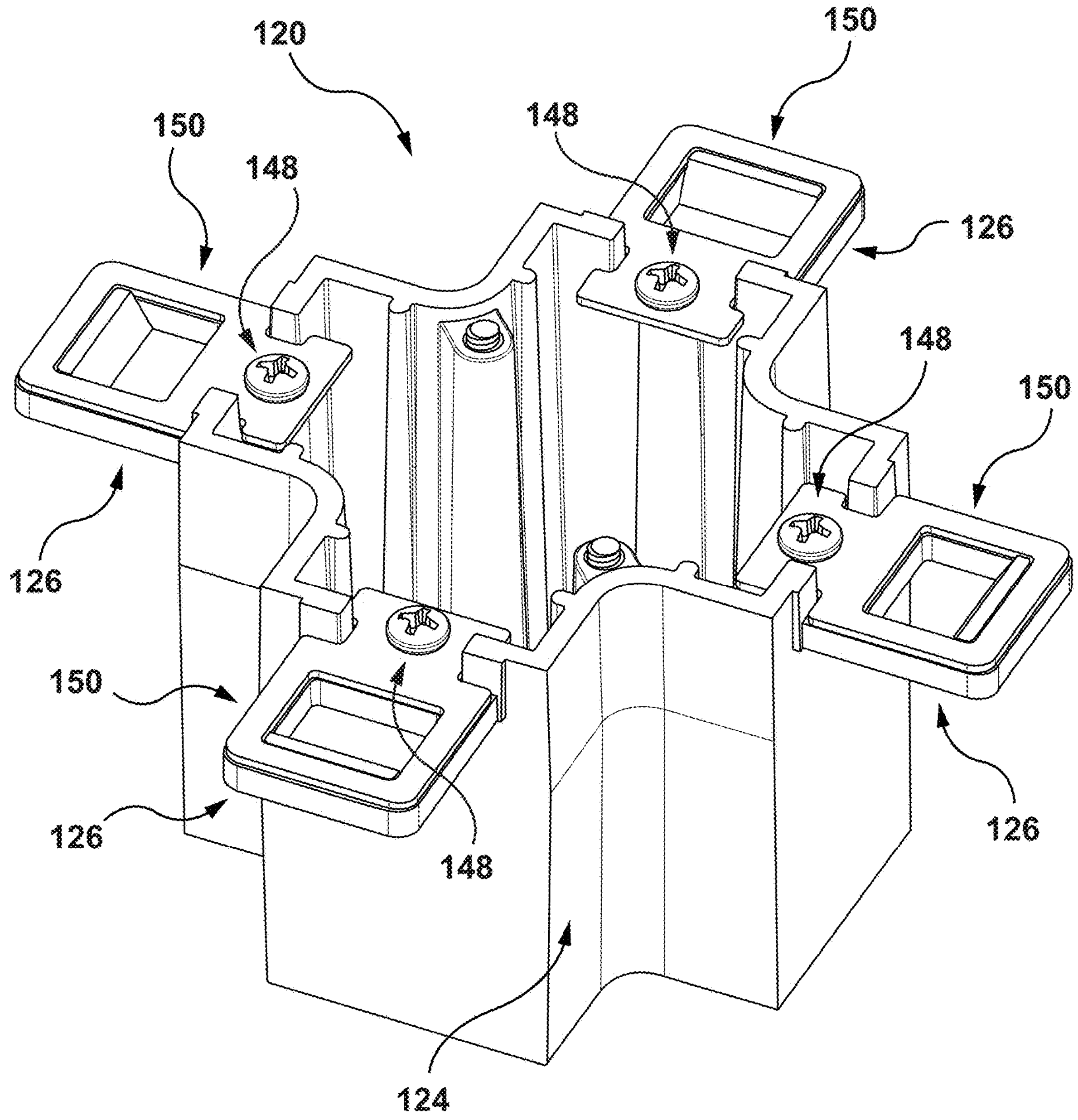
FIG. 30 is a top perspective assembly of a portion of the device of FIGS. 27 to 29.

The junction device 120 may be provided with a junction body structure 122 formed from at least one junction body segment 124, with a plurality of coupling units shown at 126. Referring to FIG. 28, each coupling unit 126 includes at least one first boundary 128 including at least one male portion 130 or part thereof, or at least one female portion or part thereof, as shown schematically at 134 in FIG. 29, which in the presented example may replace the adjacent male portion 130. The male and/or female portions 130, 134 or parts thereof may thus enable each corresponding female portion 134 or a part thereof of a first of the coupling units or the housing sections to receive the male portion 130 or a part thereof of a second of the coupling units or the housing sections 10, 12.

Figure 31:
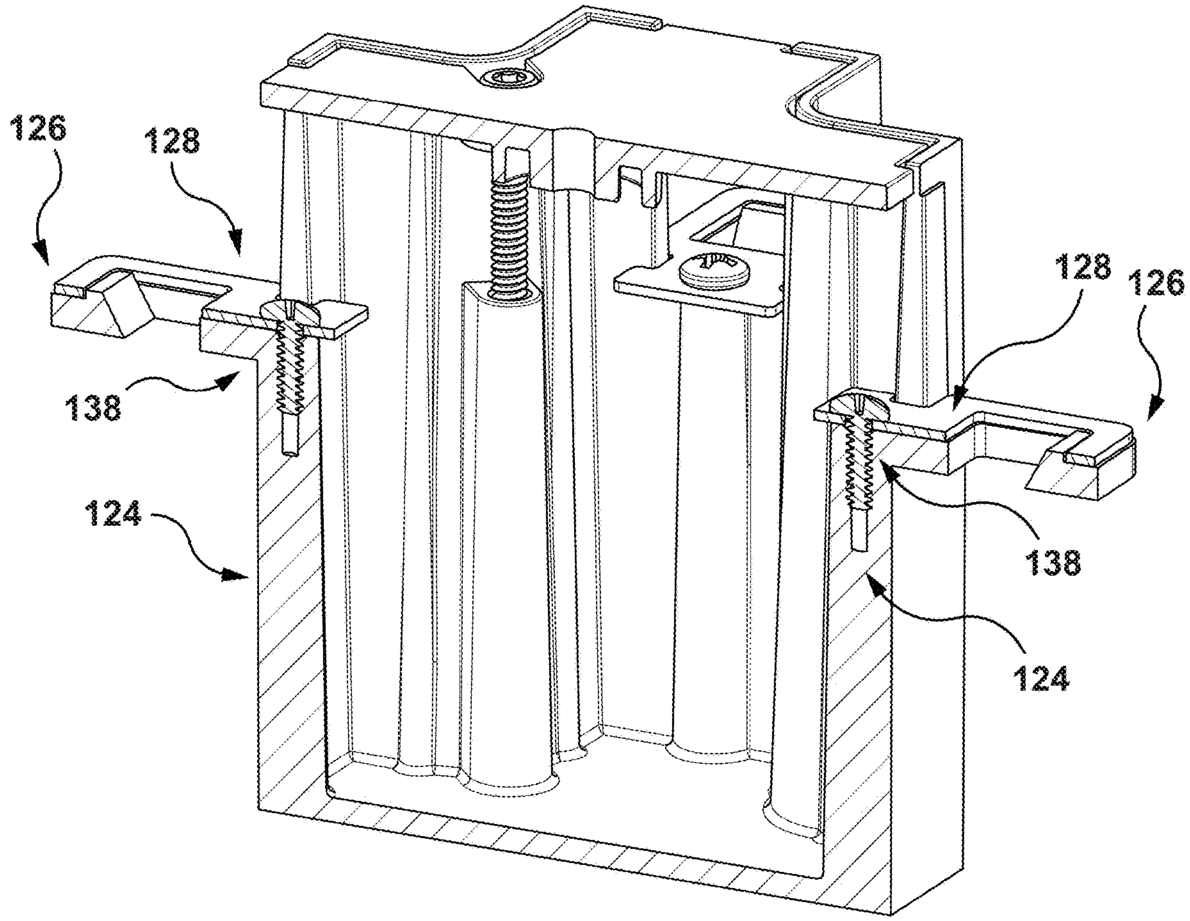
FIG. 31 is a sectional view taken on line 31-31 of FIG. 27.

Referring to FIG. 31, in some exemplary embodiments, each of the at least two of the coupling units 126 may include a first segment 138 integrally formed with the at least one junction body segment 124 at respective first boundaries 128, with the corresponding male portions 130 (or female portions 134) or respective parts thereof extending therefrom. Further, each of the male and female portions 130, 134 or parts thereof may be configured to be associated with a locking structure or function, as may be provided by a locking latch such as that shown at 24 in FIG. 1, to latch the female and male portions 134, 130 or parts thereof together, thereby to form the assembled light fixture housing, such as in the form of the light fixture housing assembly 13.

As shown in FIG. 28, for the male portions 130, each of the male and/or female portions 134 or parts thereof of the least two coupling units 126 may include a first surface 140, while a second segment may be provided as shown at 142 with a second surface 144, configured to be adjacent the first surface 140, for example to strengthen the corresponding one of the at least two coupling units.

In some exemplary embodiments, the first segments 138 of the at least two coupling units 126 may be integrally formed, for example by molding using die casting or injection molding as examples, with the at least one junction body segment 124 to form the junction body structure 122, with a corresponding region 123 defined adjacent each of the male and/or female portions 130, 134 or parts thereof thereon, and presenting the first surface 140 to receive the second segment 142 at the second surface 144.

In some exemplary embodiments, the at least one junction body segment 124 may further comprise a passage 146 adjacent a corresponding region to receive a fastener 148 therein to removably anchor the second segment 142 thereto. The second segment 142 may be further provided in the form of a plate structure 150 configured to extend along the region 123 in contact with the first segment 138. The plate structure may be provided with a periphery 152, which may be configured to match a corresponding profile of the region 123. The plate structure 150 may include a pair of opposed notches 154 or other configurations to receive corresponding projections 156 or other configurations of the junction body structure 122.

Figure 27:
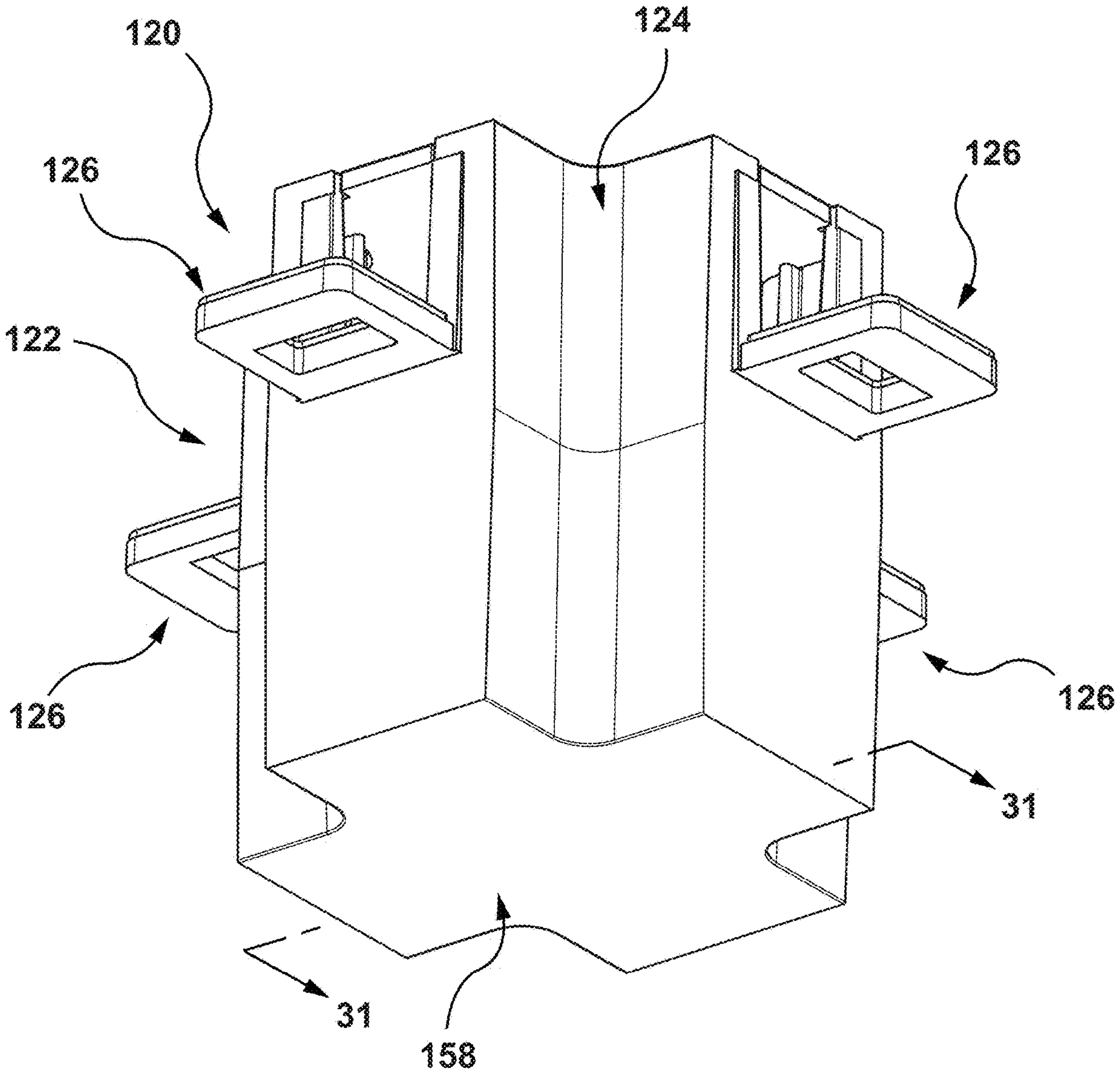
FIG. 27 is a bottom perspective view of a junction device.

In some exemplary embodiments, as shown in FIGS. 27 and 28, the junction body structure 122 may include a first closed section 158 and a second open section 160, with a cover structure 162 removably attachable to the second open end section 160.

In some exemplary embodiments, one or more of the male portions 130 may include at least one latch passage 164 therein to receive the locking latch 24, and the plate structure 150 may also present a latch passage 166 configured to be coextensive with the latch passage 164.

Thus, in some exemplary embodiments, a light fixture housing assembly may be assembled, as discussed above, by utilizing at least two housing sections 10, 12 configured to form with at least one instance of the junction device 120, a joint interface or other end-to-end engagement.

The junction device 120 may be used in the assembly of a light fixture housing assembly, by providing at least a pair of light fixture housing sections 10, 12 with complementary end regions so that each is configured to form a joint or coupling interface with at least one junction device, such as for example junction device 120 which may have two or more male portions 130. Each of the light fixture housing sections 10, 12 may then be assembled with the junction device 120, by engaging an exposed male portion 130, or part thereof, with a receptive female portion, or part thereof, on a corresponding one or more of the housing sections. A locking function, as may be provided by the locking latch 24, may then be deployed to secure the male and female portions together, in the manner discussed above.

While the present disclosure describes various exemplary embodiments, the disclosure is not so limited. To the contrary, the disclosure is intended to cover various modifications and equivalent arrangements, as will be readily appreciated by the person of ordinary skill in the art.

The invention claimed is:

1. A junction device for joining together with at least one housing section of a light fixture housing assembly, comprising at least one coupling unit with at least one first boundary including at least one male portion or part thereof, or at least one female portion or part thereof, wherein the at least one male portion or the at least one female portion is configured to engage a corresponding at least one female or male portion respectively in the at least one housing section, and to enable each corresponding at least one female portion of the at least one coupling unit or the at least one housing to receive the at least one male portion of the at least one coupling unit or the at least one housing, and a locking structure to be received by the at least one male portion or part thereof and the at least one female portion or part thereof to lock the corresponding at least one female portion and the at least one male portion together, thereby to form the assembled light fixture housing.

2. The junction device of claim 1, further comprising a junction body, having a first closed section and a second open section, with a cover removably attachable to the second open section.

3. The junction device of claim 1, wherein the at least one female portion includes a channel portion defining a pathway to receive the at least one male portion.

4. The junction device of claim 3, wherein the channel portion is three sided.

5. The junction device of claim 1, wherein the at least one male portion includes at least one passage therein to receive the locking structure.

6. The junction device of claim 5, wherein the locking structure is adjustably mounted on or associated with the at least one female portion and moveable relative to and engageable with a surface adjacent the passage.

7. The light fixture housing assembly, comprising at least one housing section configured to form an end-to-end engagement with at least one instance of the junction device as defined in claim 1.

* * * * *